US010949704B2

(12) United States Patent
Jeong

(10) Patent No.: US 10,949,704 B2
(45) Date of Patent: Mar. 16, 2021

(54) ELECTRONIC APPARATUS AND CONTROL METHOD THEREOF

(71) Applicant: SAMSUNG ELECTRONICS CO., LTD., Suwon-si (KR)

(72) Inventor: Soonmook Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/572,736

(22) Filed: Sep. 17, 2019

(65) Prior Publication Data

US 2020/0117945 A1 Apr. 16, 2020

(30) Foreign Application Priority Data

Oct. 15, 2018 (KR) ........................ 10-2018-0122542

(51) Int. Cl.
*G06K 9/00* (2006.01)
*G06K 9/46* (2006.01)
(Continued)

(52) U.S. Cl.
CPC ......... *G06K 9/4652* (2013.01); *G06K 9/3241* (2013.01); *G06K 9/4604* (2013.01); *G06T 7/12* (2017.01)

(58) Field of Classification Search
CPC .. G06K 9/4652; G06K 9/3241; G06K 9/4604; G06T 7/12
(Continued)

(56) References Cited

U.S. PATENT DOCUMENTS 6,256,411 B1 * 7/2001 Iida ..................... H04N 1/00795
358/486
7,346,212 B2 * 3/2008 Cheatle ................... G06T 11/60
382/173
(Continued)

FOREIGN PATENT DOCUMENTS

EP 3 316 570 5/2018
EP 3 337 161 6/2018
(Continued)

OTHER PUBLICATIONS

International Search Report and Written Opinion dated Jan. 16, 2020 in counterpart International Application No. PCT/KR2019/012698.

(Continued)

*Primary Examiner* — Jonathan S Lee
(74) *Attorney, Agent, or Firm* — Nixon & Vanderhye, P.C.

(57) ABSTRACT

Disclosed is an electronic apparatus. The electronic apparatus includes a communicator comprising communication circuitry, a camera, and a processor configured to control the electronic apparatus to: photograph a display device and a background area through the camera, set an area from among the background area excluding an area corresponding to the display device in the photographed image as a reference template, identify a plurality of areas from among the background area having a same pattern as a pattern included in the reference template and set at least one area, from among the plurality of areas, as a candidate template based on a color of the reference template, and obtain a pattern image on the background area based on an area set as the reference template and an area set as the candidate template, and control the display to output the background image generated based on the obtained pattern image.

20 Claims, 32 Drawing Sheets

(51) Int. Cl.
*G06T 7/12* (2017.01)
*G06K 9/32* (2006.01)

(58) Field of Classification Search
USPC .......................................................... 382/165
See application file for complete search history.

(56) References Cited

U.S. PATENT DOCUMENTS

| | | | |
|---|---|---|---|
| 8,406,566 B1 * | 3/2013 | Wilensky | G06T 7/194 |
| | | | 382/283 |
| 8,547,599 B2 | 10/2013 | Ido | |
| 9,812,086 B2 * | 11/2017 | Minato | G06T 7/12 |
| 10,109,051 B1 * | 10/2018 | Natesh | G06K 9/4652 |
| 10,339,374 B1 * | 7/2019 | Pribble | G06K 9/00456 |
| 10,467,933 B2 | 11/2019 | Hur et al. | |
| 2012/0013646 A1 | 1/2012 | Ishioka et al. | |
| 2016/0274767 A1 | 9/2016 | Gupta et al. | |
| 2018/0165052 A1 | 6/2018 | Kim et al. | |
| 2018/0190214 A1 | 7/2018 | Kim et al. | |
| 2018/0350281 A1 | 12/2018 | Hur et al. | |

FOREIGN PATENT DOCUMENTS

| | | |
|---|---|---|
| JP | 2000-020522 | 1/2000 |
| JP | 2005-292048 | 10/2005 |
| JP | 4909479 | 4/2012 |
| JP | 4966787 | 7/2012 |
| JP | 6286474 | 2/2018 |
| KR | 10-1810479 | 12/2017 |
| KR | 10-1854071 | 5/2018 |
| KR | 10-2018-0072337 | 6/2018 |
| WO | 01/13326 | 2/2001 |
| WO | 2017/078356 | 5/2017 |

OTHER PUBLICATIONS

Extended Search Report dated Mar. 5, 2020 in counterpart European Patent Application No. 19202823.1.

* cited by examiner

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2018-0122542, filed on Oct. 15, 2018, in the Korean Intellectual Property Office, the disclosure of which is incorporated by reference herein in its entirety.

BACKGROUND

1. Field

The disclosure relates to an electronic apparatus and a control method thereof and, for example, to an electronic apparatus that controls an image to be output to a display device and a control method thereof.

2. Description of Prior Art

Recent developments in electronic technology have led to development of an electronic apparatus providing various user experiences. In particular, in a standby mode, a display device capable of displaying a photo, or the like, selected by a user has been developed.

However, it is common that the photo, or the like, is not related to colors, patterns, or the like, around a display device. In this case, an area in which the display device is located is visually separated from a peripheral area of the display device, and a user may feel disharmony.

SUMMARY

Various example embodiments of the disclosure address the above-mentioned problems and output an image, which is harmonized with a peripheral area of a display device, to a display device, to reduce a visual disharmony felt by a user between an area where the display device is located and the peripheral area of the display device.

According to an example embodiment, an electronic apparatus includes a communicator comprising communication circuitry, a camera, and a processor configured to control the electronic apparatus to: photograph a display device and a background area through the camera, set an area from among the background area excluding an area corresponding to the display device in the photographed image as a reference template, identify a plurality of areas having a same pattern as a pattern included in the reference template from among the background area, set at least one area from among the plurality of areas as a candidate template based on a color of the reference template, obtain a pattern image on the background area based on an area that is set as the reference template and an area that is set as the candidate template, and control the communicator to output the background image generated based on the obtained pattern image to the display device.

The processor may be configured to set an area, from among the plurality of areas, having a color which coincides with a color of the reference template by a threshold value or more as the candidate template.

The processor may, based on identification that a plurality of areas having a color that coincides with the color of the reference template by a threshold value or more, be configured to set an area, from among the plurality of identified areas that is relatively closest to the reference template as the candidate template.

The processor may be configured to identify an area, from among the plurality of areas, having a color that coincides with the color of the reference template by a first threshold or more, and from another background area excluding the identified area, from among the plurality of areas, additionally identify an area having a color which coincides with the color of the reference template by a second threshold value or more, and based on the additionally identified area being located relatively closer to the reference template than the identified area, set the additionally identified area as the candidate template.

The processor may be configured to identify a plurality of areas having a same pattern as a pattern included in a reference template located in a horizontal direction and a vertical direction with reference to the reference template, identify an area, from among the plurality of areas, having a color that coincides with the color of the reference template by a threshold value or more in the horizontal direction and the vertical direction, set an area which is relatively closest to the reference template, from among the identified areas, in the horizontal direction and the vertical direction as the candidate template, and obtain the pattern image based on a first area where the reference template is located, a second area between the first area and an area where the candidate template set in the horizontal direction is located, a third area that is an area between the first area and the area in which the candidate template set in the vertical direction is located, and a fourth area that is an area in which areas where the second area is enlarged in the vertical direction and the area in which the third area is enlarged in the horizontal direction overlap each other.

The processor may, based on a ratio of a pattern included in a reference template occupying an area in which the reference template is located being less than a threshold value, be configured to adjust a size of the reference template so that a pattern included in the reference template occupies the area in which the reference template is located by the threshold value or more.

The processor may, based on one area of the pattern image being overlapped with the display device, be configured to identify an area corresponding to the overlapped area from among the background area, based on the overlapped area in the pattern image, and obtain the pattern image by applying an image included in the identified area to the overlapped area.

The processor may, based on one area of the pattern image overlapping with the display device, be configured to obtain the pattern image by dividing an area adjacent to the overlapped area, from among a plurality of areas included in the pattern image, into a plurality of areas, identifying an area corresponding to each of the divided areas, from among the background area, and applying each of the images included in the area adjacent to the identified area to the overlapped area.

The processor may be configured to divide the background area into a plurality of areas, and based on an area including an edge which is greater than or equal to a predetermined ratio being greater than or equal to a predetermined number, identify a plurality of areas having a same pattern as a pattern included in the reference template.

The processor may be configured to repeatedly apply the pattern image to the photographed image, and control the communicator to output a background image in which an area where the display device is located is cropped to the display device.

According to an example embodiment, a control method of an electronic apparatus includes photographing a display device and a background area, setting an area from among the background area excluding an area corresponding to the display device in the photographed image as a reference template, identifying a plurality of areas having a same pattern as a pattern included in the reference template from among the background area, setting at least one area from among the plurality of areas as a candidate template based on a color of the reference template, obtaining a pattern image on the background area based on an area that is set as the reference template and an area that is set as the candidate template, and controlling the display device to output the background image generated based on the obtained pattern image.

The setting as a candidate template may include setting an area having a color which coincides with a color of the reference template by a threshold value or more, from among the plurality of areas, as the candidate template.

The setting as a candidate template may include, based on identification that a plurality of areas having a color that coincides with the color of the reference template by a threshold value or more, setting an area, from among the plurality of identified areas, that is relatively closest to the reference template as the candidate template.

The setting as a candidate template may include identifying an area having a color that coincides with the color of the reference template by a first threshold or more, from among the plurality of areas, and from another background area excluding the identified area, from among the plurality of areas, additionally identifying an area having a color which coincides with the color of the reference template by a second threshold value or more, and based on the additionally identified area being located relatively closer to the reference template than the identified area, setting the additionally identified area as the candidate template.

The obtaining a pattern image may include identifying a plurality of areas having a same pattern as a pattern included in a reference template located in a horizontal direction and a vertical direction with reference to the reference template, identifying an area, from among the plurality of areas, having a color that coincides with the color of the reference template by a threshold value or more in the horizontal direction and the vertical direction, setting an area which is relatively closest to the reference template, from among the identified areas, in the horizontal direction and the vertical direction as the candidate template, and obtaining the pattern image based on a first area where the reference template is located, a second area between the first area and an area where the candidate template set in the horizontal direction is located, a third area that is an area between the first area and the area in which the candidate template set in the vertical direction is located, and a fourth area that is an area in which areas where the second area is enlarged in the vertical direction and the area in which the third area is enlarged in the horizontal direction overlap each other.

The control method may further include, based on a ratio of a pattern included in a reference template occupying an area in which the reference template is located being less than a threshold value, adjusting a size of the reference template so that a pattern included in the reference template occupies the area in which the reference template is located by the threshold value or more.

The obtaining the pattern image may include, based on one area of the pattern image being overlapped with the display device, identifying an area corresponding to the overlapped area from among the background area, based on the overlapped area in the pattern image, and obtaining the pattern image by applying an image included in the identified area to the overlapped area.

The obtaining the pattern image may include, based on one area of the pattern image overlapping with the display device, obtaining the pattern image by dividing an area adjacent to the overlapped area, from among a plurality of areas included in the pattern image, into a plurality of areas, identifying an area corresponding to each of the divided areas, from among the background area, and applying each of the images included in the area adjacent to the identified area to the overlapped area.

The identifying the plurality of areas may include dividing the background area into a plurality of areas, and based on an area including an edge which is greater than or equal to a predetermined ratio being greater than or equal to a predetermined number, identifying a plurality of areas having a same pattern as a pattern included in the reference template.

The controlling may include repeatedly applying the pattern image to the photographed image, and controlling the communicator to output a background image in which an area where the display device is located is cropped to the display device.

According to the various example embodiments described above, the display device may output an image which is harmonized with an area around the display device, and accordingly, a user may have an experience as if there is no display device.

For example, in generating an image which is harmonized with an area around the display device, a burden of operation of a processor may be reduced using a method of repeating and composing a pattern image.

BRIEF DESCRIPTION OF THE DRAWINGS

The above and/or other aspects, features, and advantages of certain embodiments of the disclosure will be more apparent from the following detailed description taken in conjunction with the accompanying drawings, in which.

DETAILED DESCRIPTION

General terms that are currently widely used are selected as terms used in describing the various example embodiments of the disclosure in consideration of functions in the disclosure, but may be changed depending on the intention of those skilled in the art or a judicial precedent, the emergence of a new technique, and the like. In addition, in a specific case, terms may be arbitrarily chosen. In this case, the meaning of such terms will be mentioned in a corresponding description portion of the disclosure. Therefore, the terms used in describing the various example embodiments of the disclosure should be defined based on the meaning of the terms and the contents throughout the disclosure rather than simple names of the terms.

When it is decided that a detailed description for the known art related to the disclosure may unnecessarily obscure the gist of the disclosure, the detailed description may be shortened or omitted.

Example embodiments of the disclosure will be described in greater detail below with reference to the accompanying drawings, but the disclosure is not limited to example embodiments described herein.

Hereinafter, the disclosure will be described with reference to the drawings.

Figure 1:
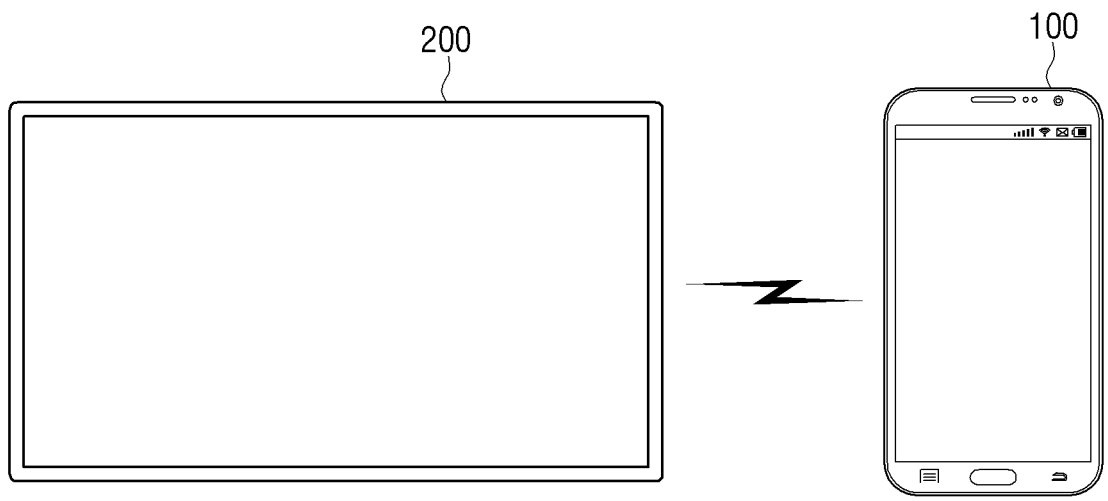
FIG. 1 is a block diagram illustrating an example electronic system according to an embodiment.

FIG. 1 is a block diagram illustrating an example electronic system according to an embodiment.

Referring to FIG. 1, an electronic system 10 according to an embodiment may include an electronic apparatus 100 and a display device 200.

As illustrated in FIG. 1, the electronic apparatus 100 may, for example, and without limitation, be a user terminal device such as a smartphone. This is merely an example, and the electronic apparatus 100 may be implemented as various electronic apparatuses including, for example, and without limitation, a camera, such as a camcorder, a tablet PC, a smart watch, or the like.

As illustrated in FIG. 1, the display device 200 may, for example, and without limitation, be a smart TV. This is merely an example, and the display device 200 may be implemented as various electronic apparatuses including, for example, and without limitation, a display, such as a digital TV, a desk-top PC, a kiosk, or the like.

The electronic apparatus 100 and the display device 200 may perform communication and transceive various data.

For example, the electronic apparatus 100 may transmit data related to a background image to the display device 200. The background image may be an image that is generated based on a background area around the display device 200. When the background image is displayed on the display device 200, a user may have an experience as if the display device 200 does not exist.

In order to generate a background image, the electronic apparatus 100 may analyze an image in which the display device 200 and a background area around the display device 200 are photographed.

For example, the electronic apparatus 100 may identify an area in which the display device 200 is located and a background area around the display device 200, in the photographed image.

In addition, the electronic apparatus 100 may obtain a pattern image based on the pattern of the background area and the color of the pattern. The pattern image may refer, for example, to a minimum unit image of a pattern included in the background area. For example, if an object of a star shape is repeatedly included in a background area, the electronic apparatus 100 may obtain a pattern image including, for example, one star object.

The electronic apparatus 100 may repeatedly apply a pattern image to the photographed image. For example, the electronic apparatus 100 may repeatedly apply a pattern image from an upper left end to a right lower end of the photographed image.

The electronic apparatus 100 may obtain a background image by cropping an area where the display device 200 is located, from an image where the pattern image is repeatedly applied.

The electronic apparatus 100 may transmit data on the background image to the display device 200.

Accordingly, the display device 200 may display a background image, and the user may have an experience as if there is no display device.

As described above, the disclosure has an effect of reducing a burden of operation of a processor using a method of repeatedly applying a minimum unit image of a pattern in generating a background image.

It has been described that the electronic apparatus 100 and the display device 200 directly communicate, but the disclosure is not limited thereto.

For example, the electronic apparatus 100 may perform communication with the display device 200 through an external device (not shown). The external device (not shown) may, for example, be a set-top box, and may also be a variety of relay devices such as, for example, and without limitation, an access point (AP) and a router for relaying communication between the electronic apparatus 100 and the display device 200, or the like. Also, the external device (not shown) may be an external server.

For example, the electronic apparatus 100 may communicate with the external device (not shown) to transmit data for a background image to the external device (not shown), and the display device 200 may receive data on the background image from the external device (not shown) and display the background image.

It has been described that the electronic apparatus 100 generates a background image using a pattern image, but the background image may be generated by the external device (not shown) or the display device 200.

For example, the electronic apparatus 100 may transmit data relating to a pattern image to an external device (not shown) or the display device 200, and the external device (not shown) or the display device 200 which receive data on the pattern image may generate the background image by repeatedly applying the pattern image.

It has been described that the electronic apparatus 100 obtains the pattern image, but the pattern image may be obtained by the external device (not shown) or the display device 200.

For example, the electronic apparatus 100 may transmit, to an external device (not shown) or the display device 200, data relating to an image of a background area around the display device 200 and the display device 200, and the external device (not shown) or the display device 200 may obtain the pattern image by analyzing the photographed image.

Hereinbelow, for convenience of description, an example embodiment in which the electronic apparatus 100 obtains the pattern image from a photographed image, generates a background image based on the pattern image, and transmits data regarding the background image to the display device 200 will be described.

Figure 2:
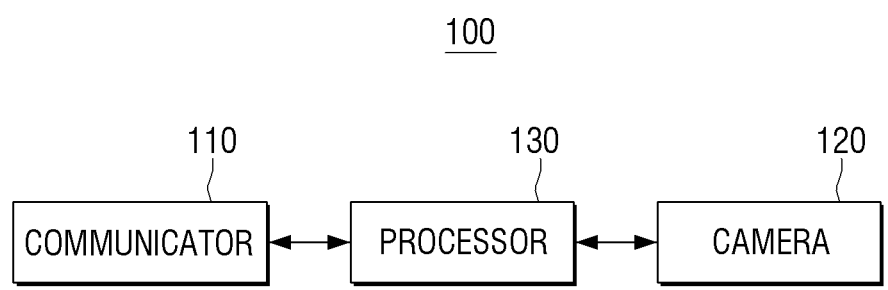
FIG. 2 is a block diagram illustrating an example electronic apparatus according to an embodiment.

FIG. 2 is a block diagram illustrating an example electronic apparatus according to an embodiment.

Referring to FIG. 2, the electronic apparatus 100 according to an embodiment may include a communicator (e.g., including communication circuitry) 110, a camera 120, and a processor (e.g., including processing circuitry) 130.

The communicator 110 may include various communication circuitry and perform communication with the display device 200 and transceive various data. In particular, the communicator 110 may transmit data on the background image generated based on the pattern image to the display device 200.

For this purpose, the communicator 110 may include various communication circuitry included in various communication chips, such as, for example, and without limitation, a wireless communication chip, a Wi-Fi chip, a Bluetooth chip, or the like.

The camera 120 may photograph various subjects.

For example, the camera 120 may photograph an area where the display device 20 is installed. The photographed image may include the display device 200 and a background area around the display device 200. The display device 200 may be installed in a form of a picture frame on one area of the wall or may be installed in a stand type on the front of the wall.

The camera 120 may be implemented as a dual camera having a plurality of camera modules. However, this is merely an example, and the camera 120 may be implemented as one camera module.

The processor 130 may include various processing circuitry and controls overall operations of the electronic apparatus 100. For this purpose, the processor 130 may include, for example, and without limitation, one or more of a central processing unit (CPU), an application processor (AP), a communication processor (CP), or the like.

Hereinbelow, an operation of the processor 130 will be described in greater detail with reference to FIG. 3 to FIG. 17B.

Figure 3:
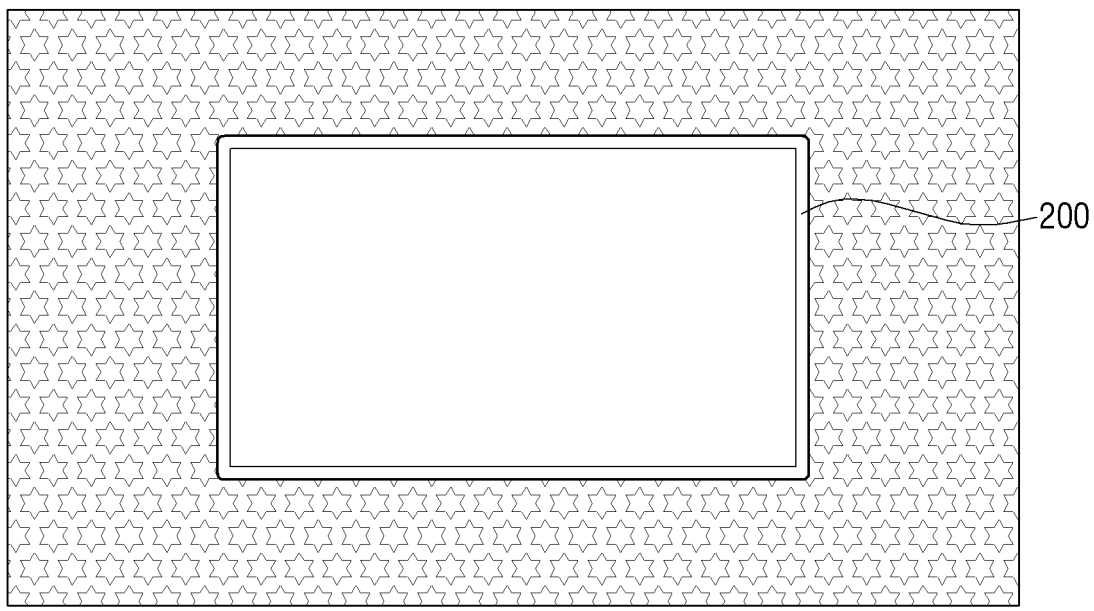
FIG. 3 is a diagram illustrating an example electronic apparatus which photographs a display device according to an embodiment.
Figure 3:
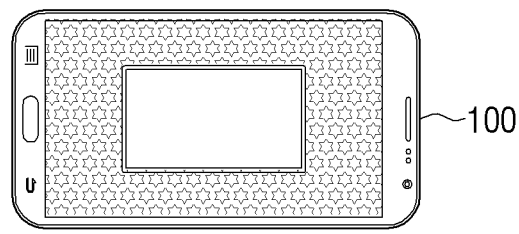

FIG. 3 is a diagram illustrating an example electronic apparatus which photographs a display device according to an embodiment.

Referring to FIG. 3, the processor 130 may photograph an area in which the display device 200 is installed, through the camera 120. For example, when a user input for controlling the camera is received, the processor 130 may photograph the display device 200 and an area including a background area around the display device 200.

A user input for controlling the camera may be performed by various methods. For example, a user input for controlling a camera may be a touch that is input to a touch screen as well as a user voice input to a microphone (not shown) of the electronic apparatus 100.

As illustrated in FIG. 3, the photographed image may include the display device 200 and a background area around the display device 200.

The processor 130 may identify the display device 200 and an area excluding the display device 200 that is, a background area around the display device 200, in the photographed image.

Figure 4:
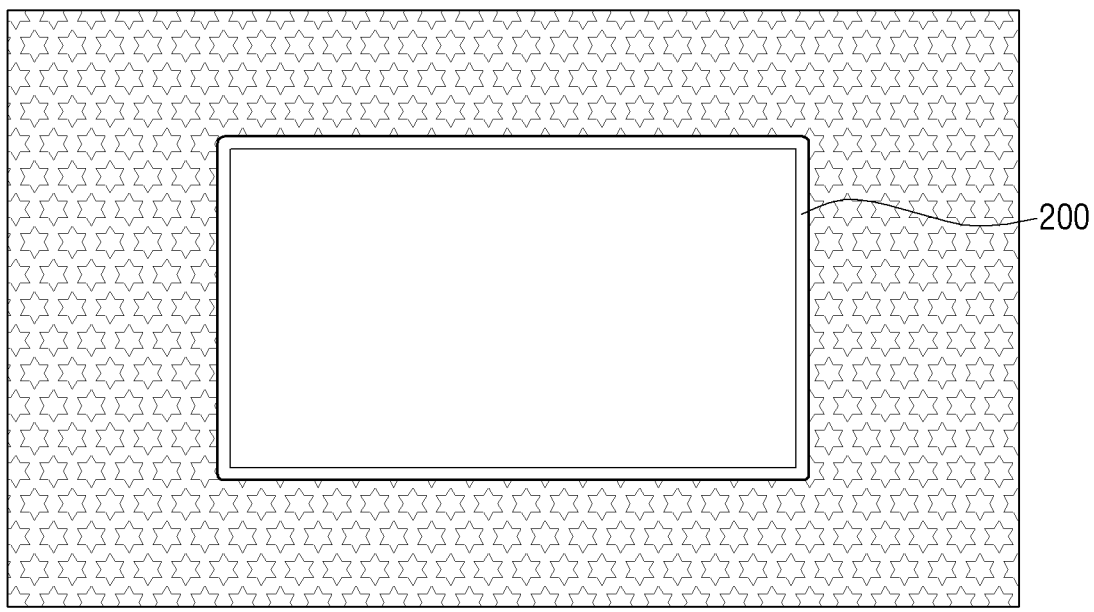
FIG. 4 is a diagram illustrating an example embodiment identifying a display device and a background area around the display device according to an embodiment.
Figure 4:
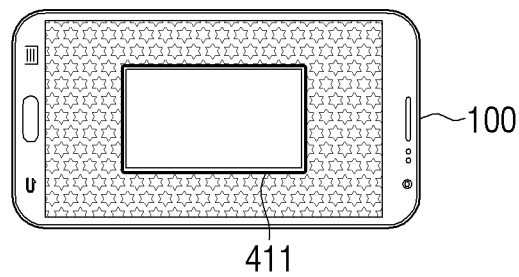
Figure 5:
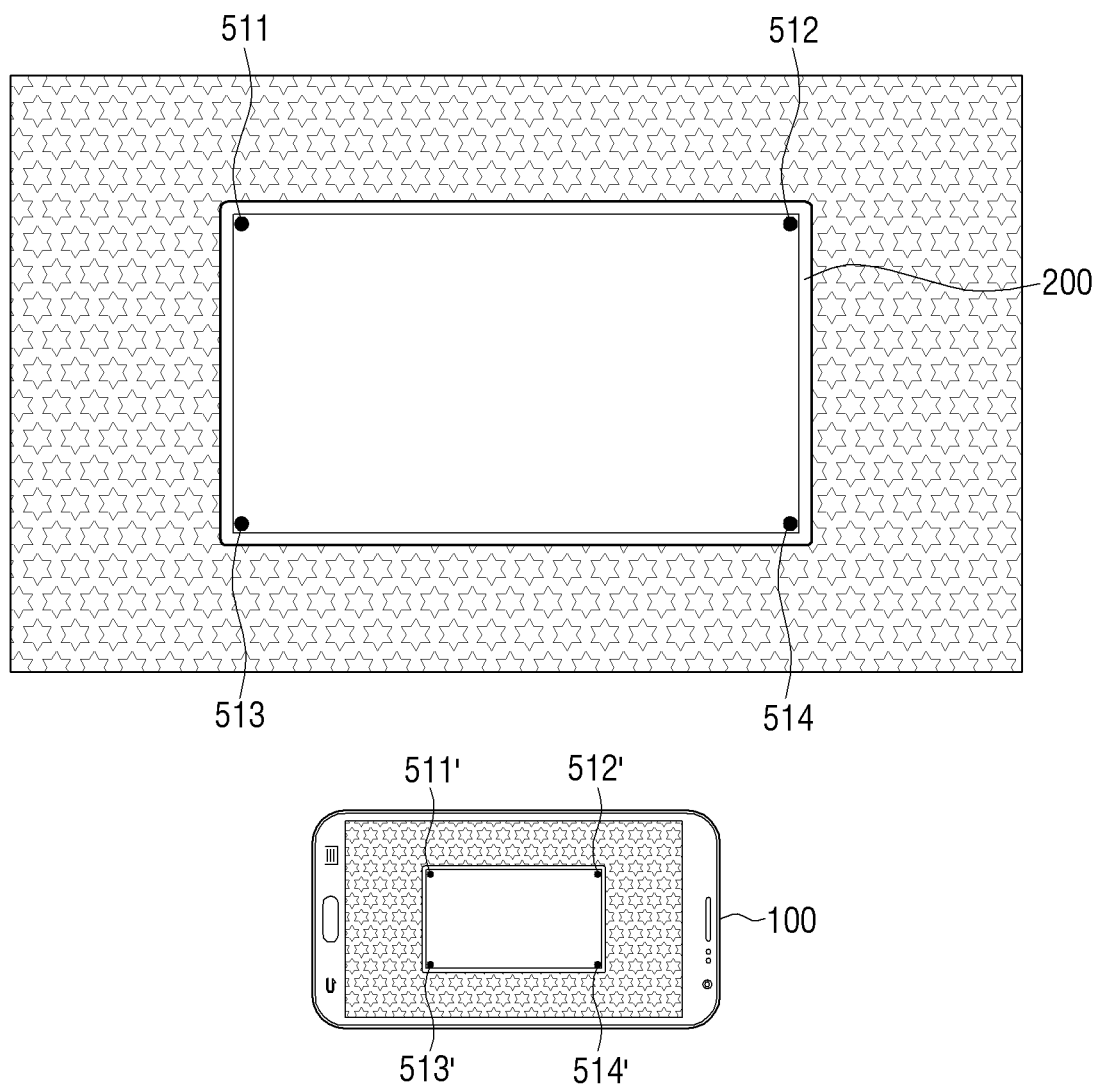
FIG. 5 is a diagram illustrating an example embodiment identifying a display device and a background area around the display device according to an embodiment.
Figure 6:
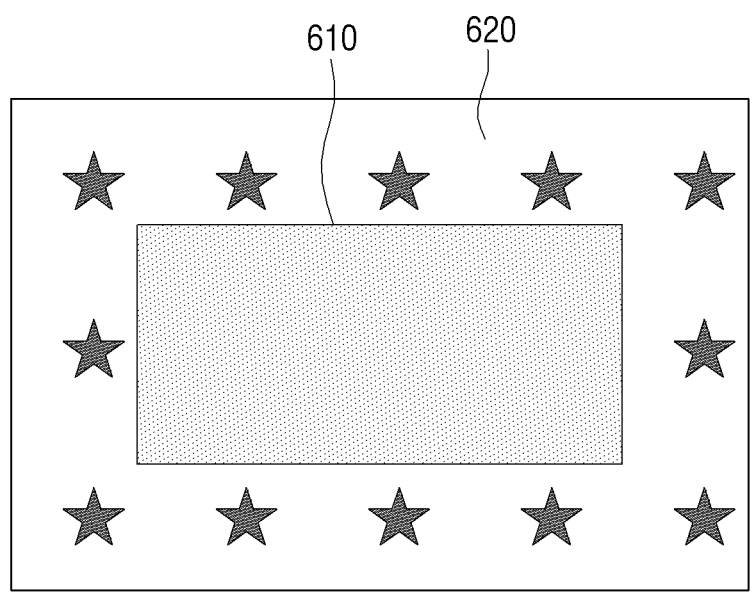
FIG. 6 is a diagram illustrating an example embodiment identifying a display device and a background area around the display device according to an embodiment.

FIGS. 4, 5 and 6 are diagrams illustrating an example embodiment identifying a display device and a background area around the display device according to an embodiment.

The processor 130 may identify the display device 200 and a background area around the display device 200.

For this purpose, when the camera application is executed, the processor 130 may display a guide user interface (UI) 411, as illustrated in FIG. 4. The guide UI 411 may, for example, be a UI for guiding so that the display device 200 is included in a specific area.

When the display device 200 and an area including a background area around the display device 200 are photographed according to a user command, the processor 130 may analyze the photographed image, and identify an area including the guide UI 411 as an area where the display device 200 is located, and another area as a background area around the display device 200.

For example, after extracting an outline portion of the display device 200 through the guide UI, the processor 130 may identify the area included in the extracted outline portion as an area where the display device 200 is located, and identify another area as a background area around the display device 200.

The processor 130 may control the communicator 110 to output the guide UI 411 to the display device 200. For example, when the user command for displaying the guide UI is received, the processor 130 may control the communicator 110 to transmit a signal requesting display of the guide UI to the display device 200, and accordingly, the display device 200 may display the guide UI.

When the area including the display device 200 and a background area around the display device 200 is photographed according to a user command, the processor 130 may analyze the photographed image as described above, and identify that the area included in the guide UI is the area where the display device 200 is located and the another area is the background area around the display device 200.

As another embodiment, the processor 130 may identify the display device 200 and a background area around the display device 200 using a marker displayed on the display device 200.

The processor 130 may control the display device 200 to output the marker according to a user command. For example, when a user command for outputting a marker is received, the processor 130 may transmit a signal requesting the output of the marker to the display device 200. The processor 130 may transmit a signal requesting the marker output to an external device (not shown), such as a set-top box, and the display device 200 may output a marker based on a signal requesting a marker output received from an external device (not shown).

In this example, referring to FIG. 5, the display device 200 may display a marker 511, 512, 513 and 514 (which may be referred to hereinafter as 555 to 514) on each corner area on the screen.

The processor 130 may control the camera 120 to photograph an area including the display device 200 in which four markers 511', 512', 513' and 514' (which may be referred to hereinafter as 511' to 514') are displayed.

The processor 130 may extract an outline portion of the display device 200 using the four markers 511' to 514' included in the photographed image, and identify an area included in the extracted outline portion as an area in which the display device 200 is located, and identify another area as a background area around the display device 200.

The embodiment above is only an example embodiment, and a method for identifying the display device 200 and a background area around the display device 200 is not necessarily limited thereto.

For example, the processor 130 may recognize a square-shaped object, by applying an object recognition algorithm to an image photographed through the camera 120, identify the recognized object having a predetermined ratio (for example, a width to height ratio is 16:9) as an area where the display device 200 is located, and identify the another area as a background area around the display device 200.

Accordingly, as shown in FIG. 6, the processor 130 may identify an area 610 in which the display device 200 is located and another area excluding the display device 200, that is, a background area 620, respectively, in the photographed image.

Figure 7:
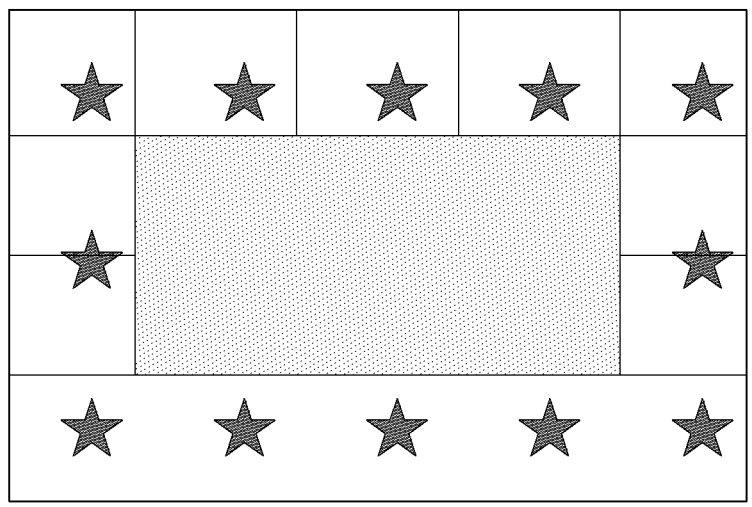
FIG. 7 is a diagram illustrating an example embodiment identifying an edge of a background area according to an embodiment.

FIG. 7 is a diagram illustrating an example embodiment identifying an edge of a background area according to an embodiment.

When a background area is identified from the photographed image, the processor 130 may identify an edge included in a background area.

For this purpose, the processor 130 may perform image processing to remove noise included in the background area. For example, the processor 130 may perform, for example, and without limitation, a blur technique for changing a focus of the photographed image, a morphology technique for performing operations such as erosion and expansion on the photographed image, or the like, to remove noise included in the background area.

As illustrated in FIG. 7, the processor 130 may divide the background area into a plurality of areas. For example, the processor 130 may divide each of a left side, an upper side, and a right side of the background area into a plurality of areas. A reason for excluding the lower side of the background area may be to consider that the display device 200 may be implemented as a stand type including a support at the lower side. According to an embodiment, when there is no object covering the background area, such as a support, on the lower side of the display device 200, the lower side of the background area may be divided into a plurality of areas.

In addition, the processor 130 may identify a ratio in which each of the plurality of areas includes an edge. For example, the processor 130 may identify an edge included in each of the plurality of areas, and identify a ratio that each of the plurality of areas includes an edge, through an edge detection algorithm.

When an area, from among a plurality of areas, including an edge which is greater than or equal to a predetermined ratio is greater than or equal to the predetermined number, the processor 130 may identify a plurality of areas having the same pattern as a pattern included in a reference template to be described later.

For example, if the predetermined ratio is 10% and the predetermined number is 5, in the case where an area including 10% or more edges is 5 or more, among a plurality of areas, the processor 130 may identify a plurality of areas having the same pattern as the pattern included in the reference template to be described later. The predetermined ratio and the predetermined number described above are merely an example, and may be variously changed based on a user command.

As such, by considering whether an edge that is equal to or greater than a predetermined ratio is included in the background area, the disclosure may prevent and/or reduce unnecessary power consumption and unnecessary operation of the processor. The background area including an edge less than a predetermined ratio may be seen to be a background area without a specific pattern, and in this case, the operations described below for obtaining a pattern image may be considered unnecessary operations.

Figure 8A:
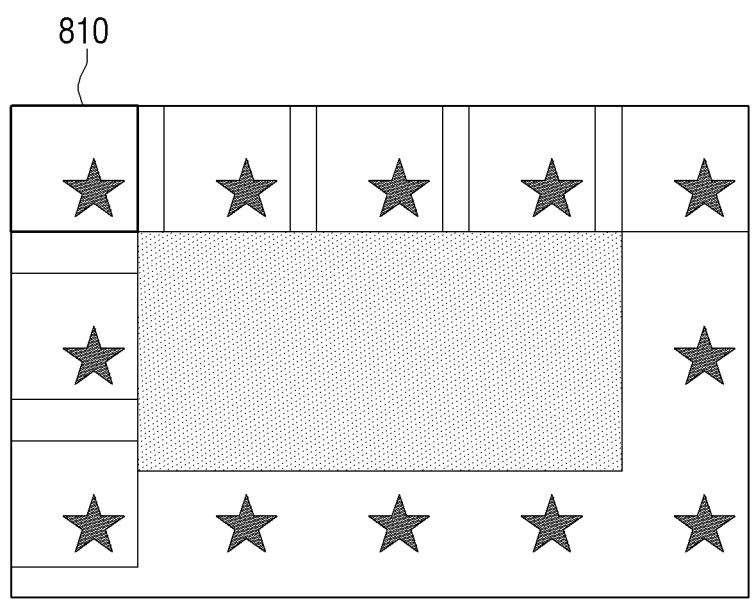
FIG. 8A is a diagram illustrating an example embodiment setting a reference template according to an embodiment.
Figure 8B:
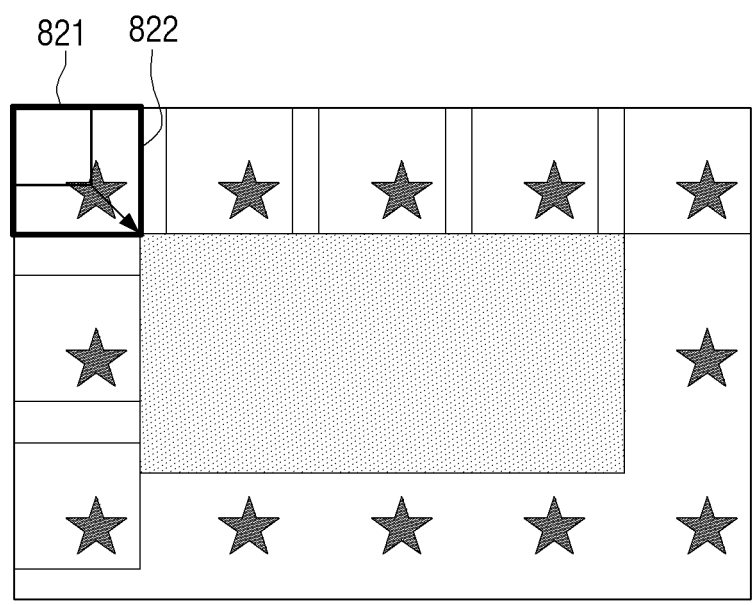
FIG. 8B is a diagram illustrating an example embodiment setting a reference template according to an embodiment.

FIGS. 8A and 8B are diagrams illustrating an embodiment setting a reference template according to an embodiment.

From the photographed image, the processor 130 may set a remaining area excluding an area that corresponds to the display device 200, for example, an area among the background area, as the reference template.

For example, as illustrated in FIG. 8A, the processor 130 may set an area in an upper left end, from the background area, as a reference template 810. This is merely an example, and the reference template may be set in various locations such as a lower left end, an upper right end, or a lower right end, or the like.

The processor 130 may adjust the size of the reference template. For example, when the ratio of the pattern included in the reference template occupying in the area where the reference template is located is less than the threshold value, the processor 130 may adjust the size of the reference template so that the pattern included in the reference template occupies the area where the reference template is located by the threshold value or more.

The pattern included in the reference template may be identified by applying an edge detection algorithm to an area where the reference template is located. For example, the processor 130 may identify an edge included in the reference template by applying an edge detection algorithm to an area where the reference template is located, and identify the identified edge as a pattern included in the reference template.

The threshold value may be predetermined, and may be set or changed in a diverse manner according to a user command.

For example, referring to FIG. 8B, when one area among the background area is set to a reference template 821, the processor 130 may apply the edge detection algorithm to an area where the reference template is located, to identify a pattern included in the reference template.

The processor 130 may identify a ratio of the pattern included in the reference template 821 occupying in the area where the reference template is located.

For example, when the area of the reference template is set to 9 cm², the processor 130 may identify a ratio of the pattern included in the reference template occupying in the area where the reference template is located, by identifying the ratio of the identified edge occupying in the area where the reference template is located.

When the ratio of the pattern included in the reference template 821 occupying in the area where the reference template is located is less than the threshold value, the processor 130 may adjust the size of the reference template so that the pattern included in the reference template occupies the area in which the reference template is located by a threshold value or more.

For example, as illustrated in FIG. 8B, the processor 130 may adjust the size of the reference template so that the pattern included in the reference template occupies the area where the reference template is located for greater than or equal to a threshold value.

The processor 130 may obtain a pattern image based on a reference template 822 of which size is adjusted.

By adjusting the size of the reference template such that the pattern included in the reference template occupies the area where the reference template is located by a threshold value or more, the disclosure may prevent and/or reduce an error which may occur when a pattern in the reference template is insufficiently recognized.

Figure 9A:
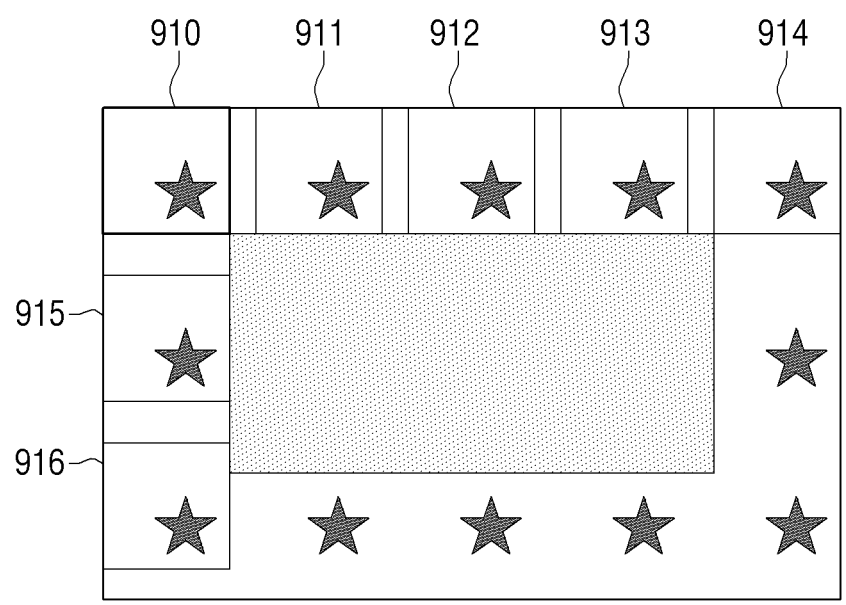
FIG. 9A is a diagram illustrating an example embodiment identifying a plurality of areas having a pattern that is the same as a pattern included in a reference template according to an embodiment.
Figure 9B:
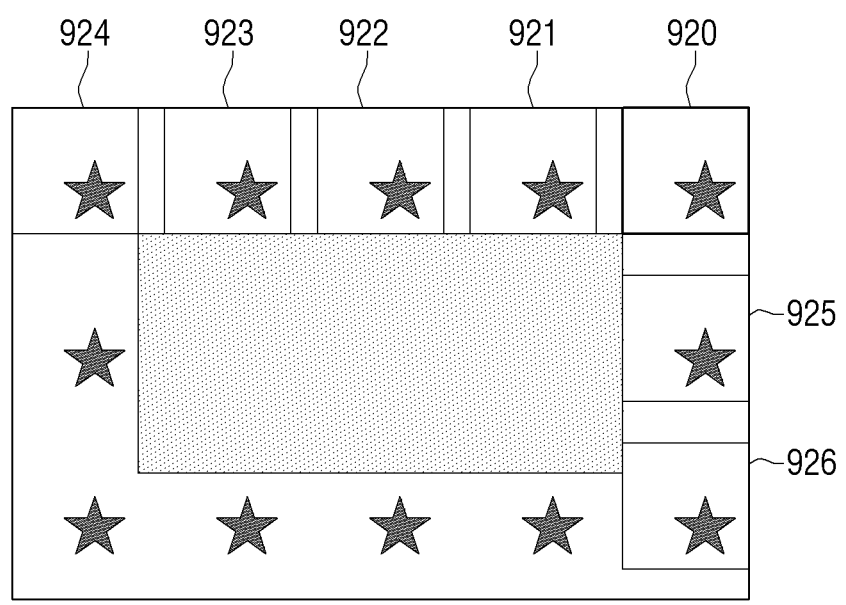
FIG. 9B is a diagram illustrating an example embodiment identifying a plurality of areas having a pattern that is the same as a pattern included in a reference template according to an embodiment.

FIGS. 9A and 9B are diagrams illustrating an example embodiment identifying a plurality of areas having a pattern which is the same as a pattern included in a reference template according to an embodiment.

The processor 130 may identify a plurality of areas having a same pattern as the pattern included in the reference template, from among the background area.

For example, when an area among the background area is set as the reference template, the processor 130 may identify a pattern included in the reference template by applying the edge detection algorithm to an area where the reference template is located.

For example, as shown in FIG. 9A, if the upper left area is set as a reference template 910, the processor 130 may identify the pattern included in the reference template by applying the edge detection algorithm to an area where the reference template 910 is located.

The processor 130 may identify a plurality of areas having the same pattern as the pattern included in the reference template, from among the background area.

For example, the processor 130 may identify a plurality of areas having the same pattern as the pattern included in the reference template, by applying the edge detection algorithm to the background area.

For example, as shown in FIG. 9A, when the upper left area of the background area is set as the reference template 910, the processor 130 may identify a plurality of areas 911, 912, 913, 914, 915, and 916 which are located in horizontal and vertical directions with respect to the reference template 910 and have the same pattern as the pattern included in the reference template 910.

The reference template 910 which is set in the upper left end is merely an example, and the reference template may be set in various positions.

For example, as shown in FIG. 9B, when the upper right area of the background area is set as a reference template 920, the processor 130 may identify a plurality of areas 921, 922, 923, 924, 925, and 926 which are located in horizontal and vertical directions with respect to the reference template 920 and have the same pattern as the pattern included in the reference template 920.

Figure 10:
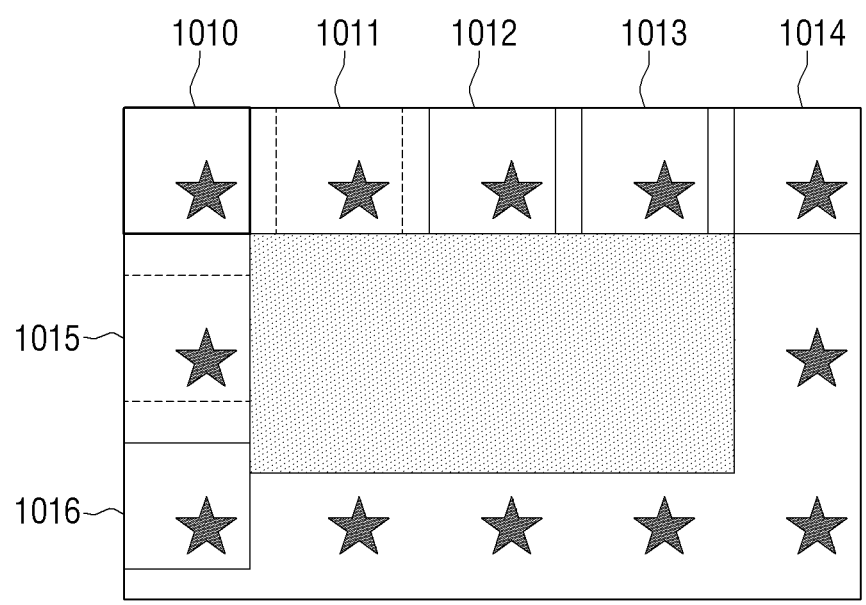
FIG. 10 is a diagram illustrating an example embodiment setting a candidate template according to an embodiment.

FIG. 10 is a diagram illustrating an example embodiment setting a candidate template according to an embodiment.

The processor 130 may set at least one area, from among a plurality of areas having the same pattern as the pattern included in the reference template, as a candidate template.

For example, the processor 130 may set an area, from among a plurality of areas, having a color that coincides with the color of the reference template by a threshold value or more as a candidate template. The threshold value may be predetermined, or may be set and changed diversely according to a user command.

For example, the threshold value may be predetermined as 80%, but this is merely an example, and the threshold value may be set and changed diversely according to a user command.

For this purpose, the processor 130 may compare color of each of a plurality of areas with the color of the reference template.

For example, the processor 130 may compare color of each of the plurality of areas and color of the reference template, in a block unit. The color may be an average value of a red-green-blue (RGB). Hereinafter, for convenience of description, it is assumed that the plurality of areas is a first area and a second area.

The processor 130 may divide each of the reference template and the plurality of areas into n blocks. For example, the processor 130 may divide the reference template and each of a plurality of areas into two blocks. The processor 130 may compare the color of the first block of the reference template with the color of the first block of each of the plurality of areas corresponding to the first block, and compare the color of the second block of the reference template to the color of the second block of each of the plurality of areas corresponding to the second block.

The processor 130 may identify a degree to which the color of each of the plurality of areas coincides with the color of the reference template, based on the result of color comparison on a block-by-block basis. For example, the processor 130 may calculate a value in which the color of each of the plurality of areas coincides with the color of the reference template in units of blocks, and identify the degree to which the color of each of the plurality of areas coincides with the color of the reference template through the value that is obtained by averaging the calculated value according to the number of blocks.

For example, when the color of the first block of the reference template coincides with the color of the first block of the first area by 70%, and the color of the second block of the reference template coincides with the color of the second block of the second area by 90%, the processor 130 may identify that the color of the first area coincides with the color of the reference template by 80%.

Similarly, in the case of the second area, a degree of coinciding with the color of the reference template may be identified, in a manner similar to the first area. For example, when the color of the first block of the reference template and the color of the first block of the second area coincide by 80%, and when the color of the second block of the reference template and the color of the second block of the second area coincide by 90%, the processor 130 may identify that the color of the second area coincides with the color of the reference template by 85%.

The processor 130 may set an area, from among a plurality of areas, having a color which coincides with the color of the reference template by a threshold value more as the candidate template.

When a plurality of areas having a color which coincides with the color of the reference template by the threshold value or more are identified, the processor 130 may set an area that is located relatively closest to the reference template as the candidate template, among the identified plurality of areas.

For example, when it is identified a plurality of areas which have a color that coincides with the reference template color by a threshold value or more in a horizontal direction with respect to the reference template, and it is identified a plurality of areas which have a color that coincides with the reference template color by the threshold value or more in a vertical direction, the processor 130 may set the area that is located relatively closest to the reference template in each of the horizontal and vertical directions as the candidate template.

For example, as shown in FIG. 10, when a plurality of areas 1011, 1012, 1013, 1014, 1015 and 1016 having the same pattern and the same color as the pattern included in a reference template 1010 are identified, an area 1011 which is located relatively closest to the reference template in the horizontal direction, and an area 1015 which is located relatively closest to the reference template in the vertical direction may be set as the candidate template.

It has been described that the color of each of the plurality of areas and the color of the reference template are compared in block units, but this is merely an example. For example, the processor 130 may compare the color of each of the plurality of areas with the color of the reference template in a pixel unit.

FIGS. 11A, 11B, 12A, 12B, 13, 14A and 14B are diagrams illustrating an example embodiment obtaining a pattern image.

The processor 130 may obtain a pattern image on the background area based on an area that is set as the reference template and an area that is set as the candidate template.

Figure 11A:
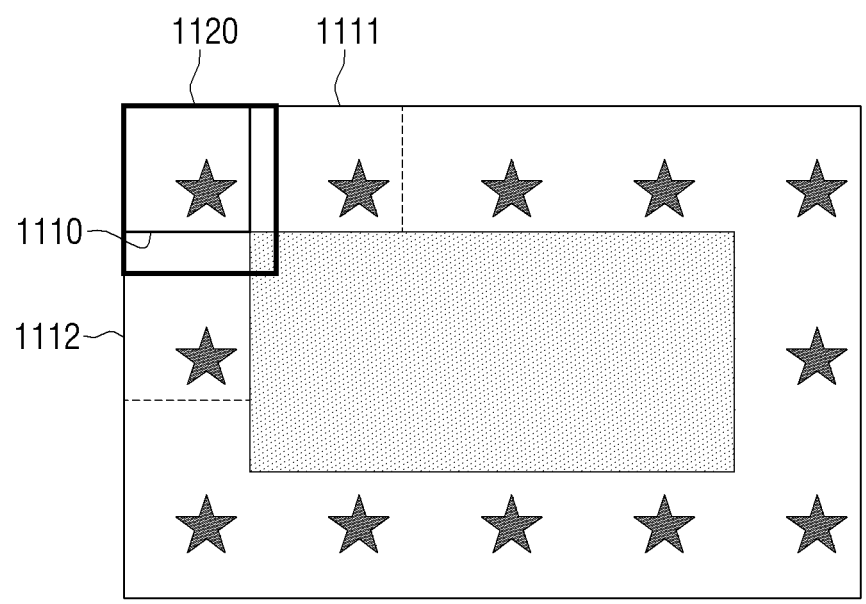
FIGS. 11A, 11B, 12A, 12B, 13, 14A and 14B are diagrams illustrating an example embodiment obtaining a pattern image according to an embodiment.

For example, as illustrated in FIG. 11A, a reference template 1110 is set in an upper left end, a first candidate template 1111 is set in a horizontal direction with respect to the reference template 1110, and a second candidate template 1112 is set in a vertical direction with respect to the reference template 1110.

In the embodiment described above, the processor 130 may obtain a pattern image based on an area in which the reference template 1110 is set, an area in which the first candidate template 1111 is set, and an area in which the second candidate template 1112 is set.

For example, the processor 130 may set an area corresponding to a pattern image 1120 from the photographed image, based on a first area where the reference template 1110 is located, a second area between the first area and the area where the candidate template 1111 set in the horizontal direction is located, a third area that is an area between the first area and the area in which the candidate template 1112 set in the vertical direction is located, and a fourth area that is an area in which the areas where which the second area is enlarged in the vertical direction and the area in which the third area is enlarged in the horizontal direction overlap each other.

Figure 11B:
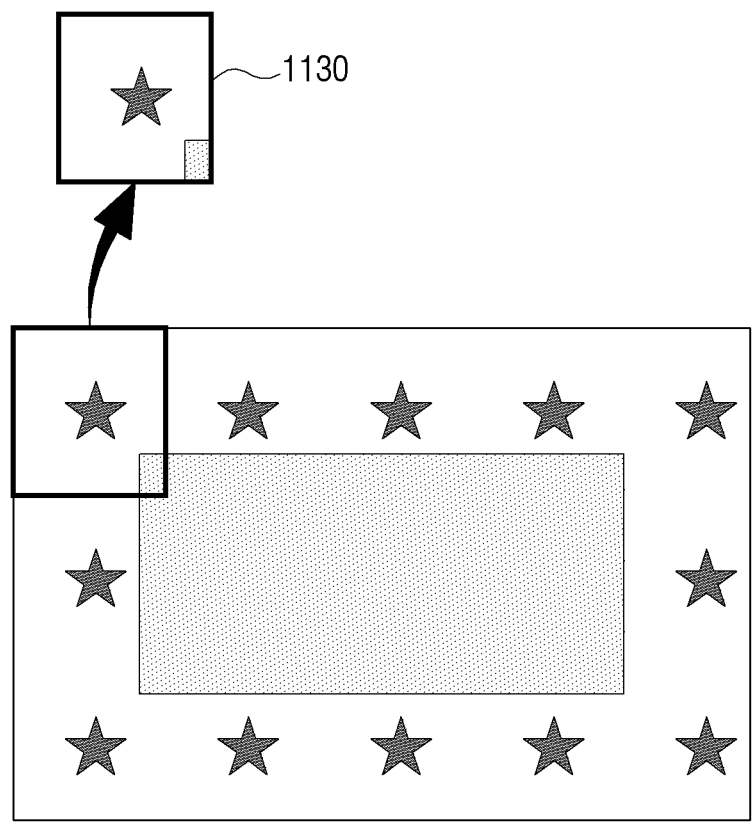

As illustrated in FIG. 11B, the processor 130 may obtain a pattern image 1130 by cropping a portion that corresponds to the pattern image from the photographed image.

Figure 12A:
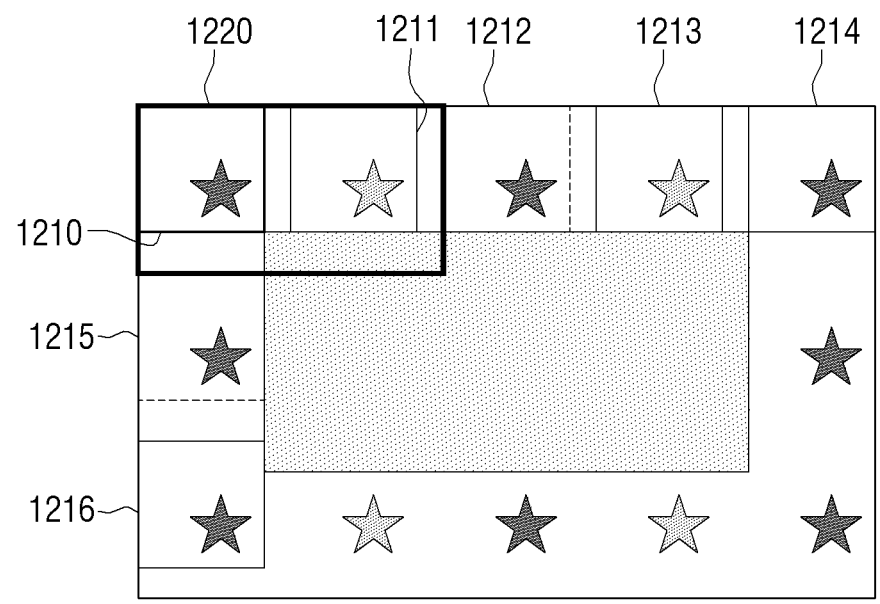

As another embodiment, referring to FIG. 12A, from among a plurality of areas 1211, 1212, 1213, 1214, 1215 and 1216 having a pattern that is the same as the pattern included in a reference template 1210, the processor 130 may identify areas 1212, 1214, 1215, and 1216 which have the color that coincides with the color of the reference template 1210 by a threshold value or more.

The processor 130, from among the areas 1212, 1214, 1215, and 1216 having the color that coincides with the color of the reference template 1210 by a threshold value or more, may set an area that is located relatively closest to the reference template in each of horizontal and vertical directions as the candidate templates 1212 and 1215.

The processor 130 may set an area corresponding to the pattern image 1220 from the photographed image, based on a first area where the reference template 1210 is located, a second area between the first area and the area where the candidate template 1212 set in the horizontal direction is located, a third area that is an area between the first area and the area in which the candidate template 1215 set in the vertical direction is located, and a fourth area that is an area in which the areas where the second area is enlarged in the vertical direction and the area in which the third area is enlarged in the horizontal direction overlap each other.

Figure 12B:
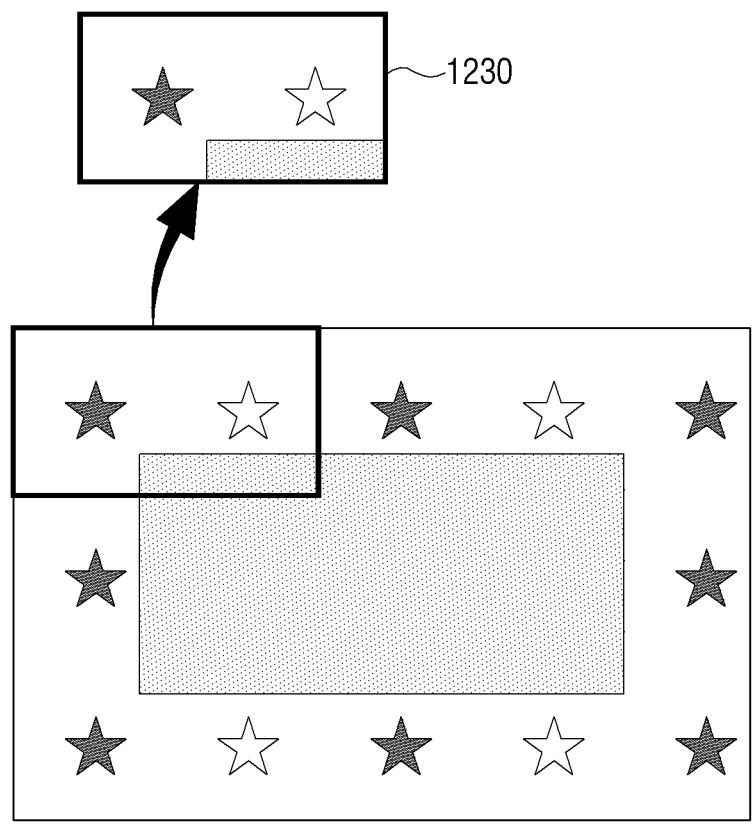

As illustrated in FIG. 12B, the processor 130 may crop the portion corresponding to the pattern image from the photographed image and obtain a pattern image 1230.

The processor 130 may set a candidate template based on a plurality of threshold values.

For example, the processor 130 may set a candidate template based on a first threshold value and a second threshold value that is less than the first threshold value. For example, the first threshold value may be 80% and the second threshold value may be 70%.

Figure 13:
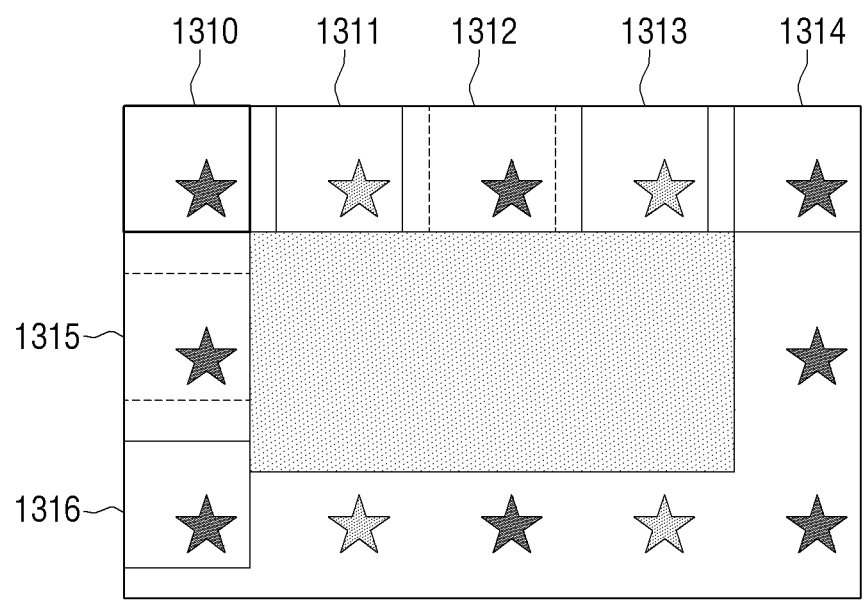

With reference to FIG. 13, the processor 130 may identify an area having a color that coincides with the color of a reference template 1310 by the first threshold value or more, from among a plurality of areas 1311, 1312, 1313, 1314, 1315 and 1316 (which may be referred to hereinafter as 1311 to 1316) having the same pattern as the pattern included in the reference template 1310.

For example, in the case of an area of which the first threshold value is 80%, and the first area 1312, the second area 1314, the third area 1315, and the fourth area 1316, from among the plurality of areas 1311 to 1316, are areas having a color that coincides with the color of the reference template 1310 by the first threshold value or more, the processor 130 may identify the first area 1312 and the second area 1314 in the horizontal direction with respect to the reference template, and identify the third area 1315 and the fourth area 1316 in the vertical direction.

As described above, the processor 130 may identify the first area 1312 and the third area 1315 which are located relatively closest to the reference template 1310 in each of the horizontal and vertical directions with respect to the reference template 1310.

The processor 130, from among remaining background areas except the identified area among the plurality of areas 1311 to 1316, may additionally identify an area having the color which coincides with the color of the reference template 1310 by the second threshold value or more.

For example, in the case of an area in which the second threshold value is 70%, and the fifth area and the sixth area 1313 have the color which coincides with the color of the reference template 1310 by the second threshold value or more, the processor 130 may additionally identify the fifth area 1311 and the sixth area 1313 in a horizontal direction with respect to the reference template.

When the additionally identified areas 1311 and 1313 are located relatively closer to the reference template 1310 than the identified area 1312, the processor 130 may set the additionally identified area as the candidate template.

According to an example embodiment, the additionally identified area 1311 is located relatively closer to the reference 1310 compared to the identified area 1312, and the processor 130 may set the additionally identified area 1311 as the candidate template.

Figure 14A:
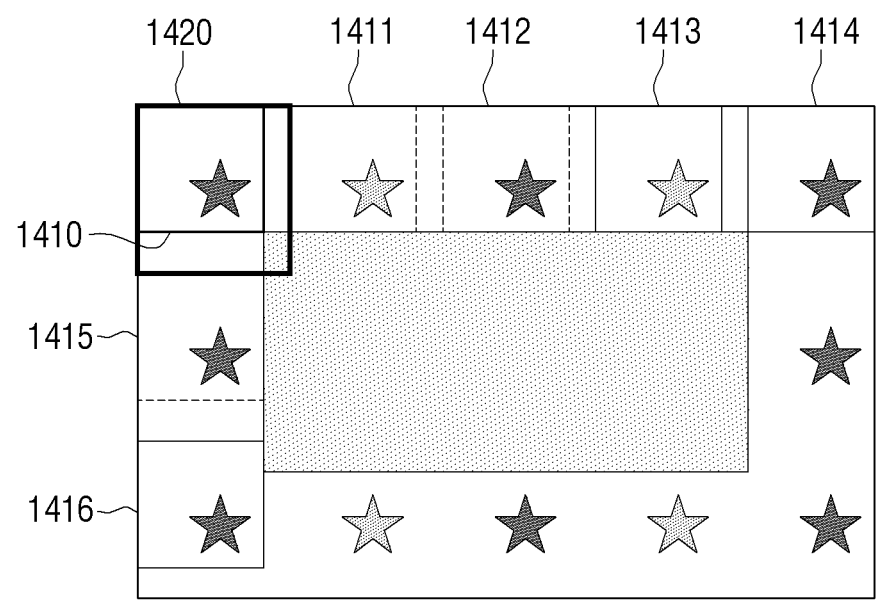

As shown in FIG. 14A, the processor 130 may set an area corresponding to a pattern image 1420 from the photographed image, based on a first area where the reference template 1410 is located, a second area between the first area and the area where the candidate template 1411 set in the horizontal direction is located, a third area that is an area between the first area and the area in which the candidate template 1415 set in the vertical direction is located from among the candidates 1411, 1412, 1413, 1414, 1415 and 1416, and a fourth area that is an area in which the areas where the second area is enlarged in the vertical direction and the area in which the third area is enlarged in the horizontal direction overlap each other.

Figure 14B:
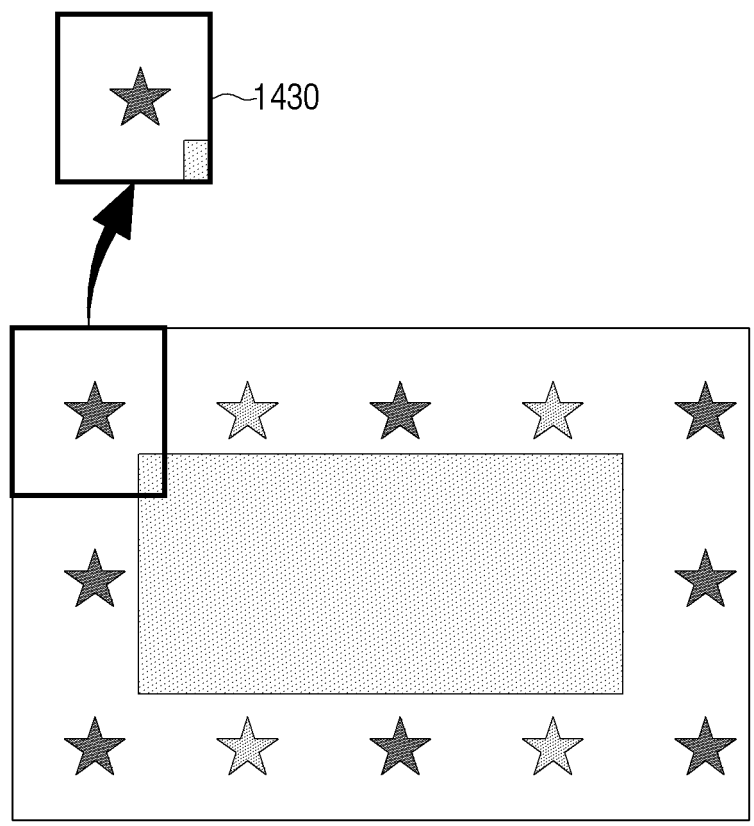

As illustrated in FIG. 14B, the processor 130 may crop a portion corresponding to the pattern image from the photographed image and obtain a pattern image 1430.

By obtaining the pattern image using two different threshold values, when a pattern having a particularly similar pattern is included in a background area, a minimum unit of a pattern image may be obtained in this disclosure.

FIGS. 15A, 15B, 16A, 16B, 16C, 16D and 16E are diagrams illustrating an example embodiment in which a part of a pattern image overlaps a display device according to an embodiment.

When a portion of the pattern image overlaps the display device 200, the processor 130 may identify a specific area corresponding to the overlapped area, from among the background area, and apply an image included in the specific area to the overlapped area.

Figure 15A:
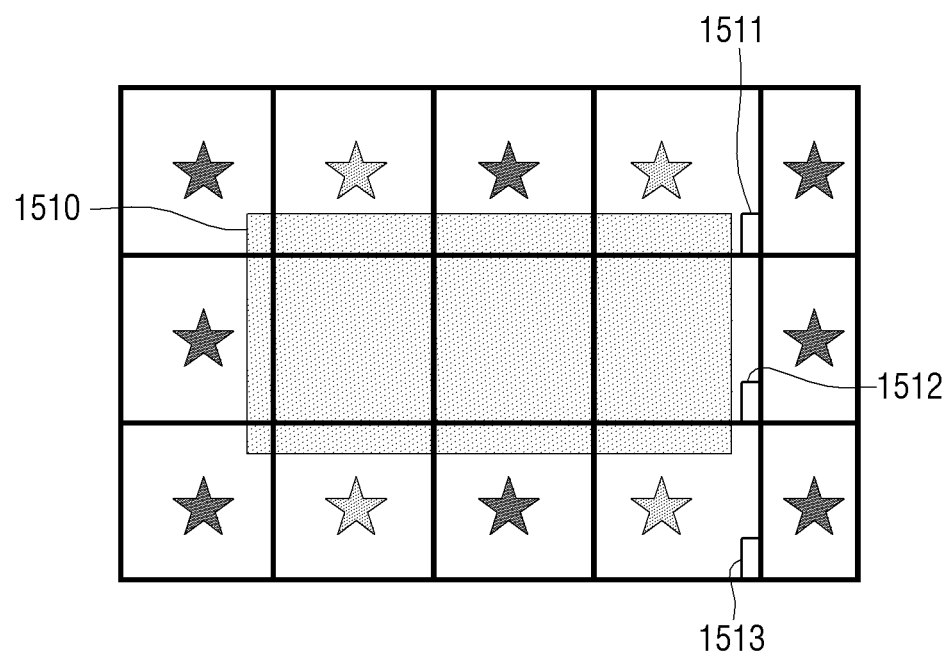
FIGS. 15A, 15B, 16A, 16B, 16C, 16D and 16E are diagrams illustrating an example embodiment in which a part of a pattern image overlaps a display device according to an embodiment.

For example, referring to FIG. 15A, when the image included in the upper left area is obtained as the pattern image, an area 1510 which overlaps the display device 200 may be include in the obtained pattern image.

In this case, the processor 130 may identify a specific area corresponding to the overlapped area 1510 from among the background area. For example, the processor 130 may identify a specific area corresponding to the overlapped area, fro, among the background area, based on the position of the overlapped area included in the pattern image.

The position of the overlapped area may be a coordinate of the overlapped area in the pattern image.

For example, the processor 130 may divide the pattern image into a plurality of blocks and identify the coordinates of the overlapped area among the plurality of blocks. From the plurality of areas obtained by dividing the photographed image by the same size of the pattern image, the processor 130 may identify an area corresponding to the same coordinates as the coordinates of the overlapped area 1510 as an area corresponding to the overlapped area 1510.

For example, referring to FIG. 15A, when the image included in the upper left area is obtained as a pattern image, the processor 130 may identify a coordinate of an overlapped area 1510 included in the pattern image.

The processor 130 may identify an area corresponding to the overlap area 1510 from a plurality of areas obtained by dividing the photographed image into a size equal to the size of the pattern image. Specifically, the processor 130 may identify an area corresponding to the coordinates of the overlapped area 1510 among the plurality of areas as an area corresponding to the overlapped area 1510.

For example, when the pattern image is divided into a plurality of blocks, in the case where the coordinate of the overlapped area 1510 is (5, 5), when each of the plurality of areas is divided into a plurality of blocks from among the plurality of areas, the processor 130 may identify the area of which the coordinate is (5, 5) as areas 1511, 1512, and 1513 corresponding to the overlapped area 1510.

As the embodiment, when there are a plurality of areas 1511, 1512, and 1513 corresponding to the overlapped area 1510, the area identified first in terms of time may be referred to as the area 1511 corresponding to the overlapped area 1510, and the areas 1512, 1513 corresponding to the overlapped area 1510, afterwards, may not be additionally identified. This is to prevent and/or reduce the computation burden of the processor 130 by not performing the additional detection operation as long as the area 1511 corresponding to the overlapped area 1510 is identified.

Figure 15B:
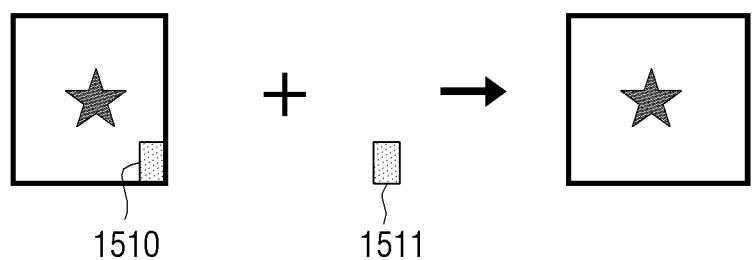

The processor 130 may apply the identified area 1511 to the overlapped area 1510, as illustrated in FIG. 15B.

Accordingly, the disclosure may obtain a pattern image corresponding to the background image.

The aforementioned method is merely an example, and the processor 130 may obtain a pattern image corresponding to the background image through another method.

Figure 16A:
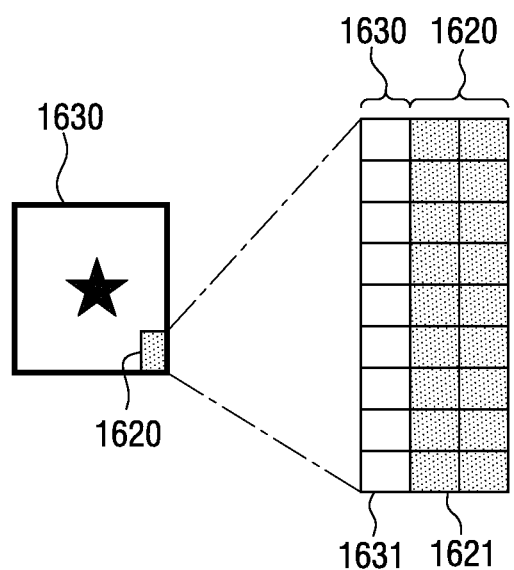

For example, referring to FIG. 16A, the processor 130 may divide an overlapped area 1620 and an area 1630 adjacent to the overlapped area included in the pattern image into a plurality of areas.

The processor 130 may identify an area corresponding to each of the divided adjacent areas in the background area. For example, the processor 130 may apply an edge detection algorithm to each of the divided adjacent areas, and identify an area having the same edge as the edge included in each of the divided adjacent areas in the background area.

Figure 16B:
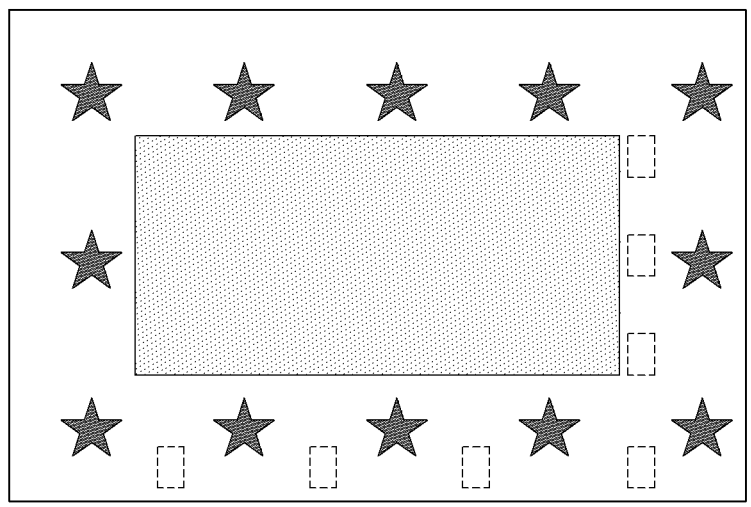

For example, referring to FIG. 16B, the processor 130 may identify an edge included in a specific area 1631 (see, e.g., FIG. 16A) by applying an edge detection algorithm to the specific area 1631 of the divided adjacent areas, and identify an area having the same edge as the edge included in the specific area 1631, in the background area by applying the edge detection algorithm to the background area.

When the areas corresponding to each of the divided adjacent areas are identified from among the background area, the processor 130 may apply each of the images included in the area adjacent to the identified area to the overlapped area.

Figure 16C:
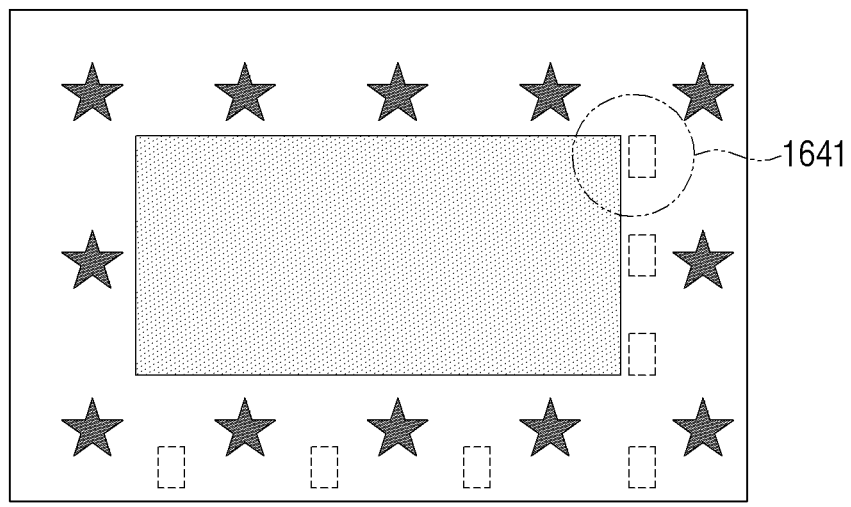
Figure 16D:
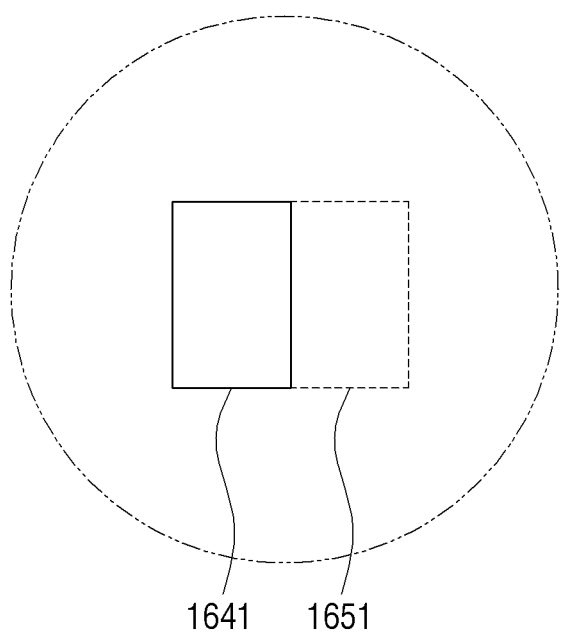

For example, as illustrated in FIG. 16C, when an area 1641 corresponding to the specific area 1631 is identified, the processor 130 may apply an image included in an area 1651 adjacent to an area 1641 identified as shown in FIG. 16D to an adjacent area 1621 of the specific area 1631.

The processor 130 may apply an image included in the area adjacent to the identified area 1641 and an image including a part of the identified area 1641 to the overlapped area.

Figure 16E:
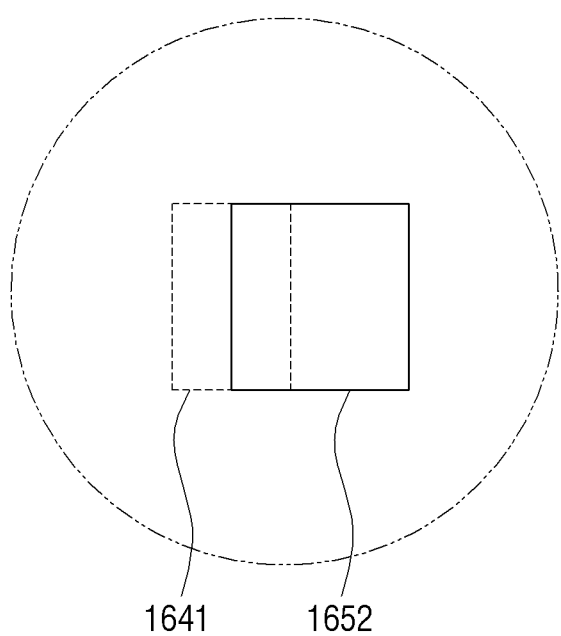

For example, as illustrated in FIG. 16E, the processor 130 may apply an image including a part of the identified area 1641 and an image 1652 including an image included in the area adjacent to the identified area 1641 to the overlapped area 1621.

Through the above method, the processor 130 may obtain a pattern image corresponding to the background image by applying an image of the specific area to each of the overlapped area 1620 that is divided into a plurality of areas.

Accordingly, an area between the area overlapped with the display device 200 and an area not overlapped with the display device 200 may be represented naturally.

Figure 17A:
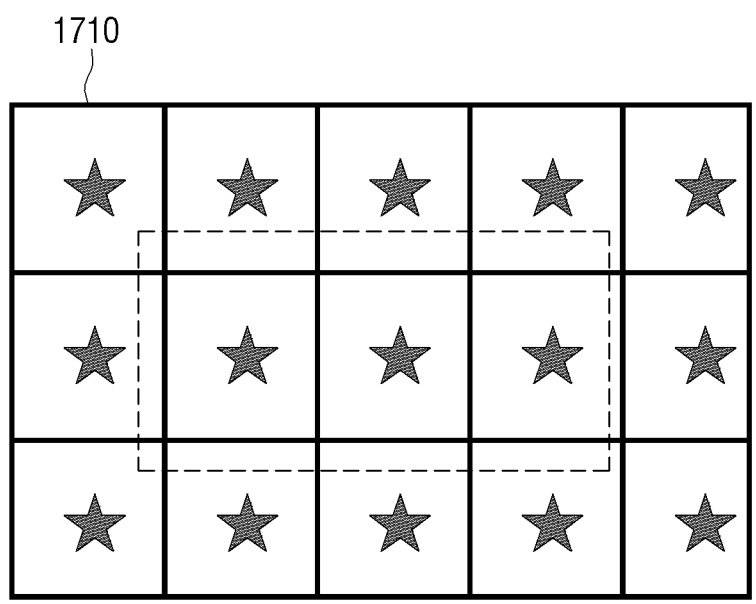
FIG. 17A is a diagram illustrating an example a background image according to an embodiment.
Figure 17B:
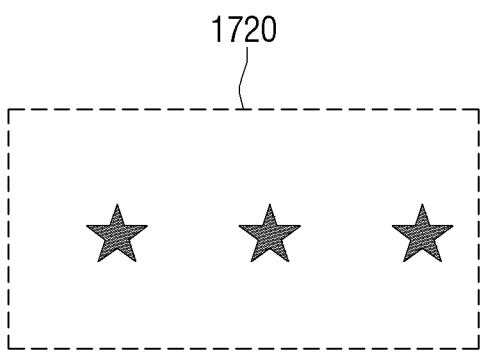
FIG. 17B is a diagram illustrating an example background image according to an embodiment.

FIGS. 17A and 17B are diagrams illustrating an example background image according to an embodiment.

The processor 130 may apply the obtained pattern image to the photographed image. For example, the processor 130 may repeatedly apply the pattern image from the upper left end to the lower right end of the photographed image. This is merely an example, and the processor 130 may generate an image having the same resolution as the photographed image, and apply the pattern image repeatedly to the generated image.

For example, referring to FIG. 17A, the processor 130 may obtain a new image by repeatedly applying a pattern image 1710 from a upper left end to a lower right end of the photographed image.

The processor 130 may crop an area corresponding to the display device 200 from an image in which the pattern image 1710 is repeatedly applied. Accordingly, a background image 1720 as shown in FIG. 17B may be obtained.

Figure 18:
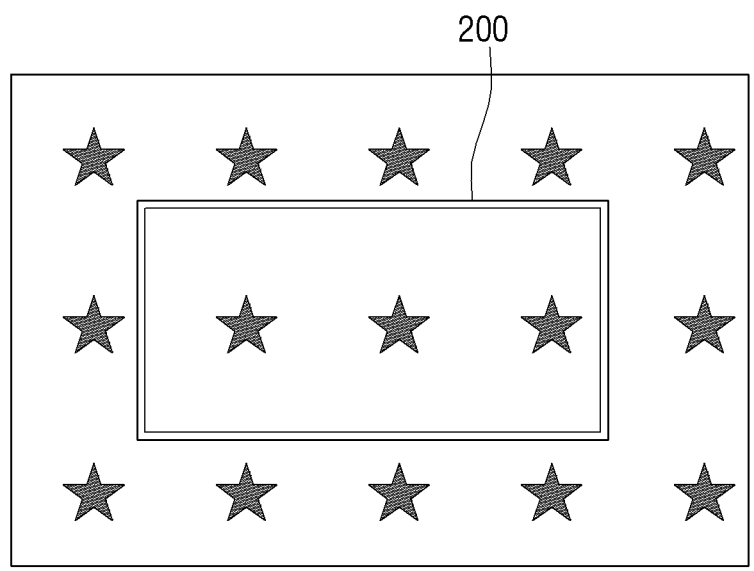
FIG. 18 is a diagram illustrating an example display device displaying a background image according to an embodiment.

FIG. 18 is a diagram illustrating an example display device displaying a background image according to an embodiment.

The processor 130 may control the communicator 110 to output a background image on the display device 200.

For example, the processor 130 may control the communicator 110 to transmit data relating to the background image to the display device 200, and the display device 200 may output the background image as illustrated in FIG. 18.

However, this is merely an example, and the processor 130 may transmit data related to the background image to an external device (not shown) such as a set-top box, and the display device 200 may receive data related to the background image from an external device (not shown), and output the background image.

Accordingly, a user may have an experience as if there is no display device.

Figure 19:
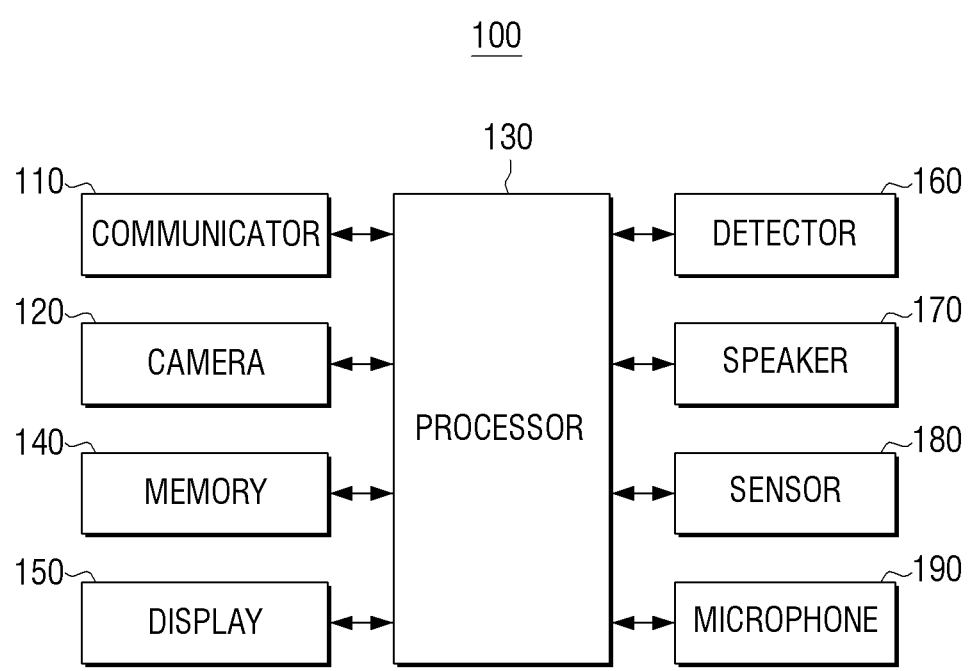
FIG. 19 is a block diagram illustrating an example electronic apparatus according to an embodiment.

FIG. 19 is a block diagram illustrating an example electronic apparatus according to an embodiment.

Referring to FIG. 19, the electronic apparatus 100 according to an embodiment may include the communicator (e.g., including communication circuitry) 110, a camera 120, a memory 140, a display 150, a detector (e.g., including detecting circuitry) 160, a speaker 170, a sensor 180, a microphone 190, and the processor (e.g., including processing circuitry) 130. The descriptions overlapping with the foregoing may be shortened or may not be repeated here.

The memory 140 stores various modules for driving the electronic apparatus 100. For example, the memory 140 may store software including a base module, a sensing module, a communication module, a presentation module, a web browser module, and a service module. At this time, the base module may refer, for example, to a basic module that processes signals transmitted from the respective hardware included in the electronic apparatus 100 and transfers the signals to an upper layer module. The sensing module may refer, for example, to a module for collecting information from various sensors and analyzing and managing collected information, and may include, for example, and without limitation, a face recognition module, a voice recognition module, a motion recognition module, a near-field communication (NFC) recognition module, an object recognition module, and the like. The presentation module may refer, for example, to a module for constructing a display screen, and may include, for example, and without limitation, a UI, and a UI rendering module for performing graphics processing. The communication module may refer, for example, to a module for performing communication with an external device. The web browser module may refer, for example, to a module that accesses a web server by performing web browsing. The service module may refer, for example, to a module that includes various applications for providing various services.

The display 150 may display various images. For example, the display 150 may display a photographed image. The display 150 may display a guide UI for identifying the display device 200 from the photographed image.

The display 150 may be implemented as various types of displays such as, for example, and without limitation, a liquid crystal display (LCD), plasma display panel (PDP), or the like. In the display 150, a backlight unit, a driving circuit which may be implemented, for example, and without limitation, as a format such as an a-si TFT, low temperature poly silicon (LTPS) TFT, organic TFT (OTFT), or the like, may be included as well. The display 150 may be combined with a touch sensor and implemented as a touch screen.

The detector 160 may include various detecting circuitry and be implemented as various sensors. For example, the sensor 160 may include a touch sensor.

The speaker 170 may include a component outputting various audio data on which various processes such as decoding, amplification, noise filtering, and the like, are performed by an audio processor (not illustrated). In addition, the speaker 170 may output various notification sounds or a voice message. According to an embodiment, the speaker 170 may output audio when an image is photographed by the camera 120, or a background image is generated.

The sensor 180 may sense a movement of the electronic apparatus 100. For example, the sensor 180 may be implemented, for example, and without limitation, as an accelerometer, a gyro sensor, a geomagnetic sensor, or the like, and sense a movement of the electronic apparatus 100.

The sensor 180 may sense ambient illuminance. For example, the sensor 180 may be implemented, for example, and without limitation, as an illuminance sensor and sense illuminance, a direction of external light incident on the electronic apparatus 100, brightness, or the like.

The microphone 190 may receive a user voice. The user voice may output a user voice or a background image on the display device 200 for controlling a camera. The user voice received through the microphone 190 may be converted to a digital signal and transmitted to the processor 130.

The processor 130 may include various processing circuitry and controls overall operations of the electronic apparatus 100.

The processor 130 may correct a background image based on ambient illuminance sensed by the sensor 180.

For example, the processor 130 may correct at least one of temperature and brightness of the background image, based on at least one of color temperature and brightness information of external light that is sensed by the illuminance sensor.

For example, the processor 130 may correct entire brightness of the background image to be dark, when it is identified that intensity of light of external light is low, based on the brightness information obtained from the illuminance sensor. Accordingly, the background image displayed on the display device 200 may be harmonized with the background area around the actual display device 200.

When the user voice for displaying the background image is received via the microphone 190, the processor 130 may convert the user voice into text through, for example, a Speech to Text (STT) algorithm, and control the communicator 110 to output the background image to the display device 200 according to the text. For example, when the user voice for displaying the background image is received via the microphone 190, the processor 130 may control the camera 120 to perform the photographing, generate the background image from the image photographed through the camera, and control the communicator 110 to output the background image on the display device 200. The background image may be generated by a server (not shown). For example, when a user voice for displaying a background image is received via the microphone 190, the processor 130 may control the communicator 110 to transmit a signal corresponding to the user voice to a server (not shown), and the server (not shown) may convert the user voice into text through the STT algorithm. The server (not shown) may identify the background image in the image including the display device 200 according to the converted text, and may transmit information on the background image to the display device 200. Accordingly, the background image may be output to the display device 200.

In the disclosure, setting of the reference template, identifying of a plurality of areas having the same pattern as the pattern included in the reference template, and obtaining of the pattern image from the reference template, or the like, may be performed through an artificial intelligence (AI) model.

The AI model may, for example, and without limitation, include a model based on convolution neural network (CNN). For example, when the image including the display device 200 and the background around the display device 200 is obtained, the CNN model may identify the background area in the image, set one of the background areas as the reference template, and obtain the pattern image based on the pattern of the reference template.

The CNN model is merely an example, and the AI model may include various models such as, for example, and without limitation, deep neural network (DNN), recurrent neural network (RNN), bidirectional recurrent deep neural network (BRDNN), or the like.

Figure 20:
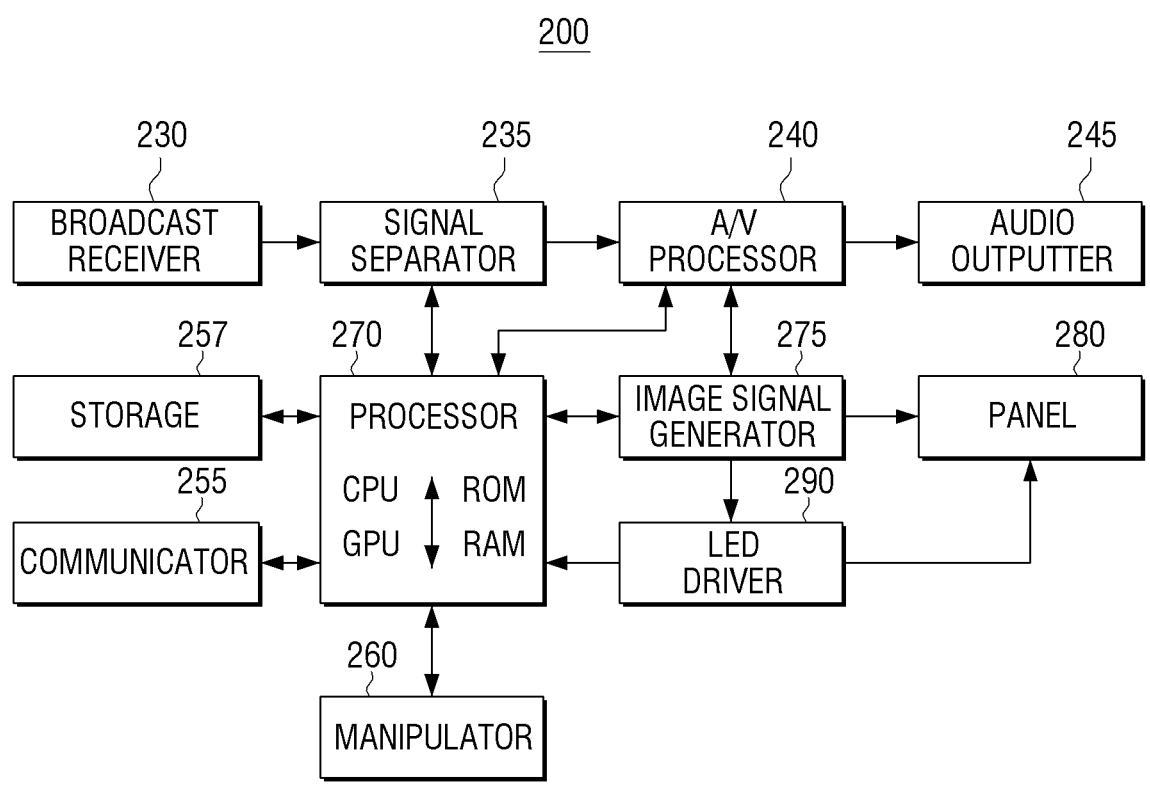
FIG. 20 is a block diagram illustrating an example display device according to an embodiment.

FIG. 20 is a block diagram illustrating an example display device according to an embodiment.

Referring to FIG. 20, the display device 200 according to an embodiment may include a broadcast receiver 230, a signal separator (e.g., including signal separating circuitry) 235, an audio/video (A/V) processor (e.g., including A/V processing circuitry) 240, an audio outputter (e.g., including audio output circuitry) 245, a storage 257, a communicator (e.g., including communication circuitry) 255, a manipulator (e.g., including interface circuitry) 260, a processor (e.g., including processing circuitry) 270, an image signal generator (e.g., including image generating circuitry) 275, a panel 280, and a light emitting diode (LED) driver 290.

The broadcast receiver 230 may receive broadcast from a broadcasting station or satellite by wire or wirelessly. The broadcast receiver 230 may be implemented, for example, as a tuner.

The signal separator 235 may include various signal separating circuitry and separates the broadcasting signal received from the broadcast receiver 230 into an image signal, an audio signal, and an additional information signal. The signal separator 235 transmits the image signal and the audio signal to the A/V processor 240.

The A/V processor 240 may include various A/V processing circuitry and perform signal processing such as, for example, and without limitation, video decoding, video scaling, audio decoding, or the like, for the image signal and audio signal which are inputted from the broadcast receiver 230 and the storage 257. The A/V processor 240 may transmit the image signal to the image signal generator 220 and transmit an audio signal to the audio outputter 145.

The audio outputter 245 may include various audio outputting circuitry and convert the audio signal received from the A/V processor 240 into sound and output the sound through the speaker (not shown).

The image signal generator 275 may include various image signal generating circuitry and generates a graphic user interface (GUI). The image signal generator 275 adds the generated GUI to the image received from the A/V processor 240. The image signal generator 275 transmits the image signal corresponding to the image to which the GUI is added to the panel 280. Accordingly, the panel 280 may display various kinds of information provided by the display device 200 and an image transmitted from the image signal generator 275.

The image signal generator 275 may extract luminance information corresponding to the image signal and generate a dimming signal corresponding to the extracted luminance information. The image signal generator 275 may provide the generated dimming signal to the panel 280. This dimming signal may, for example, be a pulse width modulation (PWM) signal. In the embodiment, it has been described that the image signal generator 275 generates a dimming signal and provides the dimming signal to the panel 280. However, the panel 280 may generate the dimming signal by itself.

The panel 280 displays an image. The panel 280 may be implemented as various types of displays such as, for example, and without limitation, a liquid crystal display (LCD), organic light emitting diodes (OLED) display, or the like. In the panel 280, a backlight unit, a driving circuit which may be implemented as a format such as an a-si TFT, low temperature poly silicon (LTPS) TFT, organic TFT (OTFT), or the like, may be included as well. The panel 280 may be combined with a touch sensor and implemented as a touch screen.

The storage 257 may store image contents. For example, the storage 257 may receive, from the A/V processor 240, image contents in which image and audio are compressed and store the same. The storage 257 may be implemented as a hard disk, a non-volatile memory, volatile memory, or the like.

The manipulator 260 may include various input interface circuitry and be implemented, for example, and without limitation, as a touch screen, a touch pad, a key button, a key pad, or the like. According to an embodiment, the manipulator 260 is an input interface.

The communicator 255 may include various communication circuitry and perform communication with various types of external devices according to various types of communication methods. The communicator 255 may include various communication circuitry in various communication chips, such as, for example, and without limitation, a Wi-Fi chip, a Bluetooth chip, or the like. The processor 270 may communicate with various types of external devices using the communicator 255. In particular, the communicator 255 may communicate with the electronic apparatus 100.

The display device 200 may further include a USB port to which a USB connector may be connected, various external input ports for connecting to various external terminals, such as a headset, mouse, LAN, a digital multimedia broadcasting (DMB) chip for receiving and processing the DMB signal, or the like.

The display device 200 may further include a power supply (not show) and a sensing unit (not shown) in addition to the configurations of FIG. 20. The power supplier supplies power to each configuration in the display device 200. The sensing unit may include various sensing devices such as a camera, a motion detector, or the like.

The display device 200 may further include an interface (not shown) which may be connected to an image providing device such as a set-top box. The interface may include various interface circuitry, such as, for example, and without limitation, a high-definition multimedia interface (HDMI) port, a component input port, a red-green-blue (RGB) port, a digital visual interface (DVI) port, a display port (DP), a USB port, or the like.

Accordingly, the display device 200 may receive, from the image providing device such as a set-top box, a broadcast signal, an image signal for the contents, an audio signal, a signal relating to a background image, or the like, through the interface (not shown).

The display device 200 may process an image signal received from the image providing device through the interface and display an image through the panel 280, convert the received audio signal to sound, and output the sound through a speaker (not shown).

The display device 200 may further include a microphone (not shown) for receiving a user voice. Here, the user voice may be various voices such as a voice for controlling a camera of the electronic apparatus 100 or a voice for displaying the background image on the panel 280, or the like.

The display device 200 may further include the illuminance sensor for sensing illuminance around display device 200. Here, the illuminance sensor may sense illuminance around the display device 200, direction of external light incident on the display device 200, brightness, or the like.

The processor 270 may include various processing circuitry and controls overall operations of the display device 200. As illustrated in FIG. 20, the processor 270 may include various processing circuitry, such as, for example, and without limitation, a central processing unit (CPU), a graphics processing unit (GPU), read-only memory (ROM), random-access memory (RAM), or the like.

The processor 270 may control the image signal generator 275 and the panel 280 to display an image according to a control command input through the manipulator 260.

For example, the processor 270, when a user voice for displaying the background image is received through the microphone (not shown), may control the panel 280 to display the background image received from the electronic apparatus 100.

The processor 270, when a user voice for displaying the background image is received through the microphone (not shown), may control the communicator 255 to transmit a signal requesting transmission of the background image to the electronic apparatus 100.

For example, when the user voice to display the background image is received through the microphone (not shown), the processor 270 may transmit, to the electronic apparatus 100, a signal requesting transmission of the background image through wireless communication such as Bluetooth or Wi-Fi.

The electronic apparatus 100 may control the camera 120 to photograph an area where the display device 200 is installed. When the area where the display device 200 is installed is photographed through the camera 120, the electronic apparatus 100 may identify the display device 200 and the background area around the display device 200, obtain the pattern image based on the background area, and generate the background image. Thereafter, the processor 270 may control the panel 280 to display the background image, once the background image is received from the electronic apparatus 100.

When a user voice to display the background image is received through the microphone (not shown), the processor 270 may transmit a signal requesting transmission of the background image to an external server (not shown) through the wireless communication such as Wi-Fi, or the like.

The external server (not shown) may transmit a signal requesting transmission of the background image to the electronic apparatus 100, and the external server (not shown) may receive the background image from the electronic apparatus 100. When the background image is received from the external server (not shown), the processor 270 may control the panel 280 to display the visualized image.

It has been described that the background image is generated from the electronic apparatus 100, but generation of the background image may be performed by the display device 200.

In accordance with an example embodiment, when an image which photographs an area including the display device 200 is received from the electronic apparatus 100, the processor 270 may identify the display and the background area around the display and obtain the pattern image corresponding to the background area, based on the background area. Then, the background image may be generated by repeatedly applying the pattern image to the photographed image. The processor 270 may control the panel 280 to display the generated background image.

The processor 270 may correct the background image based on ambient illuminance sensed by the illuminance sensor (not shown).

For example, the processor 270 may correct at least one of the color temperature and brightness of the background image, based on at least one of the color temperature and brightness information of external light sensed by the illuminance sensor.

For example, when it is identified that the brightness of the external light is low, the processor 270 may control the panel 280 to display the entire brightness of the background image in a dimmed manner, based on the information on the intensity of light obtained from the illuminances sensor, and if it is identified that the intensity of light is high, the processor 270 may control the panel 280 to adjust and display the entire brightness of the background image to be bright. Accordingly, the background image displayed on the display device 200 may be harmonized with the background area around the actual display device 200.

Figure 21:
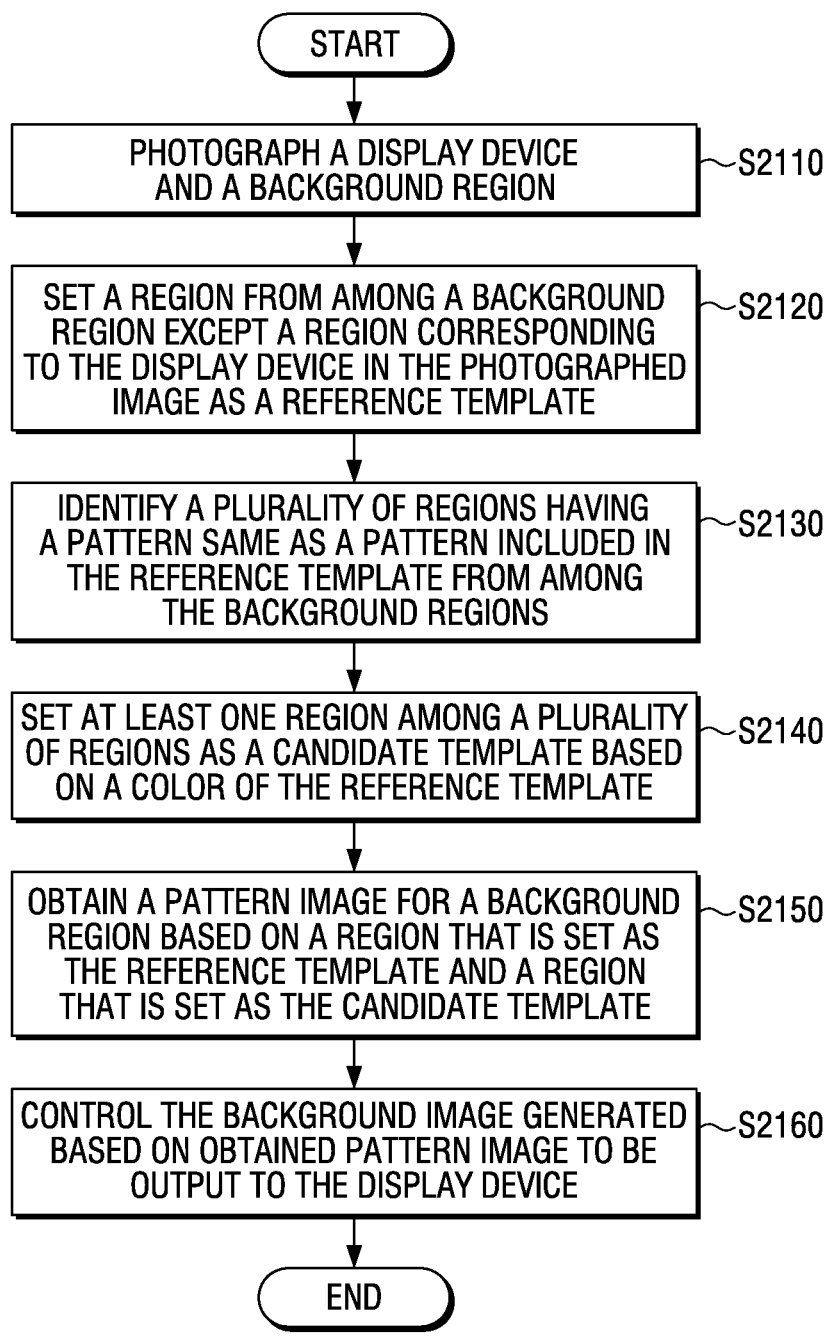
FIG. 21 is a flowchart illustrating an example control method of an electronic apparatus according to an embodiment.

FIG. 21 is a flowchart illustrating an example control method of an electronic apparatus according to an embodiment.

The electronic apparatus may photograph the display device and the background area around the display device in S2110.

The electronic apparatus may identify the display device and the background area around the display device in the photographed image. For this purpose, the electronic apparatus may use a guide UI, a marker, or the like.

The electronic apparatus may set a region from among the background region excluding an area corresponding to the display device, from the photographed image, as the reference template in S2120.

For example, the electronic apparatus may set an upper left area, from among the background area, as the reference template. This is merely an example, and the reference template may be set in various positions such as a lower left end, an upper right end, a lower right end, or the like.

When the ratio of the pattern included in the reference template occupying in the area where the reference template is located is less than the threshold value, the electronic apparatus may adjust the size of the reference template so that the pattern included in the reference template occupies the area where the reference template is positioned by a threshold value or more.

The electronic apparatus may identify a plurality of regions having the same pattern as the pattern included in the reference template among the background regions in S2130. For example, the electronic apparatus may apply the edge detection algorithm to each of the reference template and the background area, and identify a plurality of areas having the same pattern as the pattern included in the reference template among the background regions.

The electronic apparatus may set at least one region of a plurality of regions as a candidate template based on a color of the reference template in S2140. For example, the electronic apparatus may set an area having an RGB average value which coincides with the RGB average value of the reference template, among a plurality of areas, by the threshold value or more, as the candidate template.

The electronic apparatus may obtain a pattern image for the background region based on the region that is set as the reference template and the region that is set as the candidate template in S2150.

The electronic apparatus may repeatedly apply the pattern image to the photographed image and generate the background image.

The electronic apparatus may control the background image generated based on the obtained pattern image to be output to the display device in S2160.

Accordingly, the display device may display an image that is harmonized with the background area around the display device.

The methods according to various example embodiments may be implemented as a format of software or application installable to a related art electronic apparatus.

The methods according to various example embodiments may be implemented by software upgrade of a related art electronic apparatus, or hardware upgrade only.

The various embodiments described above may be implemented through an embedded server provided in the electronic apparatus or a server outside the electronic apparatus.

A non-transitory computer readable medium which stores a program for sequentially executing a method for controlling an electronic apparatus according to an embodiment may be provided.

The non-transitory computer readable medium refers to a medium that stores data semi-permanently, and is readable by an apparatus. For example, the aforementioned various applications or programs may be stored in the non-transitory computer readable medium, for example, and without limitation, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely examples and are not to be construed as limiting the disclosure. The disclosure can be readily applied to other types of apparatuses. Also, the description of the embodiments of the disclosure is intended to be illustrative, and not to limit the scope of the claims, and many alternatives, modifications, and variations will be apparent to those skilled in the art. While one or more embodiments have been described with reference to the figures, it will be understood by those of ordinary skill in the art that various changes in form and details may be made therein without departing from the spirit and scope as defined, for example, by the following claims and their equivalents.

What is claimed is:

1. An electronic apparatus comprising:
   a communicator comprising communication circuitry;
   a camera; and
   a processor configured to control the electronic apparatus to:
   photograph a display device and a background area through the camera,
   set an area from among the background area excluding an area corresponding to the display device in the photographed image as a reference template,
   identify a plurality of areas, from among the background area, having a same pattern as a pattern included in the reference template, and set at least one area, from among the plurality of areas, as a candidate template based on a color of the reference template, and
   obtain a pattern image of the background area based on an area set as the reference template and an area set as the candidate template, and control the communicator to output a background image generated based on the obtained pattern image to the display device.

2. The electronic apparatus of claim 1,
   wherein the processor is further configured to control the electronic apparatus to set an area having a color corresponding to a color of the reference template by a threshold value or more, from among the plurality of areas, as the candidate template.

3. The electronic apparatus of claim 2,
   wherein the processor is configured to control the electronic apparatus to set an area, from among the plurality of identified areas which is relatively closest to the reference template as the candidate template based on identification that a plurality of areas have a color corresponding to the color of the reference template by a threshold value or more.

4. The electronic apparatus of claim 1,
   wherein the processor is further configured to control the electronic apparatus to:
   identify an area, from among the plurality of areas, having a color corresponding to the color of the reference template by a first threshold or more, and additionally identify in another background area excluding the identified area, from among the plurality of areas, an area having a color corresponding to the color of the reference template by a second threshold value or more, and set the additionally identified area as the candidate template based on the additionally identified area being located relatively closer to the reference template than the identified area.

5. The electronic apparatus of claim 1,
   wherein the processor is further configured to control the electronic apparatus to:
   identify a plurality of areas having a same pattern as a pattern included in a reference template located in a horizontal direction and a vertical direction with reference to the reference template,
   identify an area, from among the plurality of areas, having a color corresponding to the color of the reference template by a threshold value or more in the horizontal direction and the vertical direction,
   set an area, from among the identified areas, which is relatively closest to the reference template in the horizontal direction and the vertical direction as the candidate template, and obtain the pattern image based on a first area where the reference template is located, a second area between the first area and an area where the candidate template set in the horizontal direction is located, a third area between the first area and the area in which the candidate template set in the vertical direction is located, and a fourth area in which areas where the second area is enlarged in the vertical direction and the area in which the third area is enlarged in the horizontal direction overlap each other.

6. The electronic apparatus of claim 1,
wherein the processor is further configured to control the electronic apparatus to:
adjust a size of the reference template so that a pattern included in a reference template occupies an area in which the reference template is located by a threshold value or more based on a ratio of a pattern included in the reference template occupying the area in which the reference template is located being less than the threshold value.

7. The electronic apparatus of claim 1,
wherein the processor is further configured to control the electronic apparatus to:
based on one area of the pattern image being overlapped with the display device, identify an area corresponding to the overlapped area from among the background area, based on the overlapped area in the pattern image, and obtain the pattern image by applying an image included in the identified area to the overlapped area.

8. The electronic apparatus of claim 1,
wherein the processor is further configured to control the electronic apparatus to:
obtain the pattern image by dividing an area adjacent to the overlapped area, from among a plurality of areas included in the pattern image, into a plurality of areas based on one area of the pattern image overlapping with the display device, identifying an area corresponding to each of the divided areas from among the background area, and applying each of the images included in the area adjacent to the identified area to the overlapped area.

9. The electronic apparatus of claim 1,
wherein the processor is further configured to control the electronic apparatus to:
divide the background area into a plurality of areas, and identify a plurality of areas having a same pattern as a pattern included in the reference template based on an area including an edge which is greater than or equal to a predetermined ratio being greater than or equal to a predetermined number.

10. The electronic apparatus of claim 1,
wherein the processor is further configured to control the electronic apparatus to:
repeatedly apply the pattern image to the photographed image, and control the communicator to output a background image in which an area where the display device is located is cropped to the display device.

11. A method of controlling an electronic apparatus, the method comprising:
photographing a display device and a background area;
setting an area, from among the background area excluding an area corresponding to the display device, in the photographed image as a reference template;
identifying a plurality of areas, from among the background area, having a same pattern as a pattern included in the reference template and setting at least one area, from among the plurality of areas, as a candidate template based on a color of the reference template; and
obtaining a pattern image of the background area based on an area set as the reference template and an area set as the candidate template, and controlling the background image generated based on the obtained pattern image to be output to the display device.

12. The method of claim 11,
wherein the setting as a candidate template comprises setting an area, from among the plurality of areas, having a color corresponding to a color of the reference template by a threshold value or more as the candidate template.

13. The method of claim 12,
wherein the setting as a candidate template comprises setting an area, from among the plurality of identified areas that is relatively closest to the reference template as the candidate template based on identification that a plurality of areas having a color corresponding to the color of the reference template by a threshold value or more.

14. The method of claim 11,
wherein the setting as a candidate template comprises:
identifying an area, from among the plurality of areas, having a color corresponding to the color of the reference template by a first threshold or more and from another background area excluding the identified area from among the plurality of areas, additionally identifying an area having a color corresponding to the color of the reference template by a second threshold value or more, and setting the additionally identified area as the candidate template based on the additionally identified area being located relatively closer to the reference template than the identified area.

15. The method of claim 11,
wherein the obtaining a pattern image comprises:
identifying a plurality of areas having a same pattern as a pattern included in a reference template located in a horizontal direction and a vertical direction with reference to the reference template, identifying an area, from among the plurality of areas, having a color corresponding to the color of the reference template by a threshold value or more in the horizontal direction and the vertical direction, setting an area which is relatively closest to the reference template, from among the identified areas, in the horizontal direction and the vertical direction as the candidate template, and obtaining the pattern image based on a first area where the reference template is located, a second area between the first area and an area where the candidate template set in the horizontal direction is located, a third area between the first area and the area in which the candidate template set in the vertical direction is located, and a fourth area in which areas where the second area is enlarged in the vertical direction and the area in which the third area is enlarged in the horizontal direction overlap each other.

16. The method of claim 11, further comprising:
adjusting a size of the reference template so that a pattern included in the reference template occupies the area in which a reference template is located by a threshold value or more based on a ratio of a pattern included in the reference template occupying an area in which the reference template is located being less than the threshold value.

17. The method of claim 11, wherein the obtaining the pattern image comprises:

based on one area of the pattern image being overlapped with the display device, identifying an area corresponding to the overlapped area from among the background area, based on the overlapped area in the pattern image, and obtaining the pattern image by applying an image included in the identified area to the overlapped area.

18. The method of claim 11, wherein the obtaining the pattern image comprises:

obtaining the pattern image by dividing an area adjacent to the overlapped area, from among a plurality of areas included in the pattern image, into a plurality of areas based on one area of the pattern image overlapping with the display device, identifying an area corresponding to each of the divided areas, from among the background area, and applying each of the images included in the area adjacent to the identified area to the overlapped area.

19. The method of claim 11, wherein the identifying the plurality of areas comprises:

dividing the background area into a plurality of areas, and based on an area including an edge which is greater than or equal to a predetermined ratio being greater than or equal to a predetermined number, identifying a plurality of areas having a same pattern as a pattern included in the reference template.

20. The method of claim 11, wherein the controlling comprises repeatedly applying the pattern image to the photographed image, and controlling the communicator to output a background image in which an area where the display device is located is cropped to the display device.

* * * * *